(12) United States Patent
Sasaki et al.

(10) Patent No.: US 9,630,675 B2
(45) Date of Patent: Apr. 25, 2017

(54) VEHICLE

(71) Applicant: YAMAHA HATSUDOKI KABUSHIKI KAISHA, Iwata-shi, Shizuoka (JP)

(72) Inventors: Kaoru Sasaki, Shizuoka (JP); Yosuke Hirayama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/901,351

(22) PCT Filed: Jun. 30, 2014

(86) PCT No.: PCT/JP2014/067477
§ 371 (c)(1),
(2) Date: Dec. 28, 2015

(87) PCT Pub. No.: WO2015/002164
PCT Pub. Date: Jan. 8, 2015

(65) Prior Publication Data
US 2016/0152291 A1   Jun. 2, 2016

(30) Foreign Application Priority Data

Jul. 1, 2013 (JP) .................................. 2013-138480

(51) Int. Cl.
*B62K 5/10* (2013.01)
*B62K 5/08* (2006.01)
(Continued)

(52) U.S. Cl.
CPC ................ *B62K 5/10* (2013.01); *B62K 5/027* (2013.01); *B62K 5/05* (2013.01); *B62K 5/08* (2013.01);
(Continued)

(58) Field of Classification Search
CPC . B62K 5/10; B62K 5/027; B62K 5/05; B62K 5/08; B62K 2005/001; B62K 2202/00
See application file for complete search history.

(56) References Cited

U.S. PATENT DOCUMENTS 4,865,148 A * 9/1989 Marumoto ......... B60G 17/0162
                                                  180/446
8,762,003 B2 * 6/2014 Mercier ............. B60G 17/0157
                                                  180/210
(Continued)

FOREIGN PATENT DOCUMENTS

CN            1386668 A     12/2002
CN          201176187 Y      1/2009
(Continued)

OTHER PUBLICATIONS

Official Communication issued in International Patent Application No. PCT/JP2014/067477, mailed on Sep. 22, 2014.

Primary Examiner — Faye M Fleming
(74) Attorney, Agent, or Firm — Keating and Bennett, LLP

(57) ABSTRACT

An excessive torque restricting mechanism restricts a magnitude of a torque which is to be transmitted from a steering shaft to a connecting mechanism including a tie rod, a magnitude of a torque which is to be transmitted from a left shock absorbing mechanism to the connecting mechanism, and a magnitude of a torque which is to be transmitted from a right shock absorbing mechanism to the connecting mechanism.

10 Claims, 13 Drawing Sheets

(51) Int. Cl.
   *B62K 5/027*     (2013.01)
   *B62K 5/05*      (2013.01)
   *B62K 5/00*      (2013.01)
(52) U.S. Cl.
   CPC .... *B62K 2005/001* (2013.01); *B62K 2202/00* (2013.01)

(56) References Cited

U.S. PATENT DOCUMENTS

| | | |
|---|---|---|
| 2004/0140645 A1 | 7/2004 | Hayashi |
| 2013/0168944 A1 | 7/2013 | Bartolozzi et al. |

FOREIGN PATENT DOCUMENTS

| | | |
|---|---|---|
| CN | 201305093 Y | 9/2009 |
| EP | 2 368 729 A1 | 9/2011 |
| EP | 2 399 811 A1 | 12/2011 |
| JP | 2010-163145 A | 7/2010 |
| JP | 2011-42225 A | 3/2011 |
| JP | 2011-45184 A | 3/2011 |
| JP | 2011-195100 A | 10/2011 |
| TW | 201200400 A1 | 1/2012 |
| WO | 2012/007819 A1 | 1/2012 |

\* cited by examiner

VEHICLE

BACKGROUND OF THE INVENTION

1. Field of the Invention

The present invention relates to a vehicle which is driven by power generated from a power source and which includes a leanable body frame and two front wheels which are arranged side by side in a left-right direction of the body frame.

2. Description of the Related Art

A vehicle is known that includes a body frame which leans in a left-right direction of the vehicle when the vehicle turns to the left or the right and two front wheels which are arranged side by side in a left-right direction of the body frame (refer to International Patent Publication No. 2012/007819, for example). This type of vehicle is a vehicle which turns with its body frame leaning from a vertical direction. More specifically, the body frame leans to the right of the vehicle when the vehicle turns to the right, while when the vehicle turns to the left, the body frame leans to the left of the vehicle. In this type of vehicle, a distance between the two front wheels which are arranged side by side in the left-right direction of the body frame is very short, compared with a general four-wheeled vehicle, so as to ensure a large leaning amount of the body frame. Consequently, this type of vehicle is compact in size in relation to the left-right direction of the body frame.

In this type of vehicle, a steering member is provided which turns the two front wheels in an interlocked manner according to a steering angle. Since a vehicle including a power source travels at high speeds and is accelerated or decelerated greatly, a high rigidity is required for the steering member, which is a cause for enlarging the size of the vehicle.

SUMMARY OF THE INVENTION

Thus, preferred embodiments of the present invention reduce the size of a vehicle which includes a power source, a leanable body frame, and two front wheels which are arranged side by side in a left-right direction of the body frame.

A preferred embodiment of the present invention is a vehicle including a body frame that leans to the left of the vehicle when the vehicle turns to the left and that leans to the right of the vehicle when the vehicle turns to the right; a power source supported by the body frame and that generates a force to drive the vehicle; a steering member that is turnable about a turning axis relative to the body frame; a left front wheel disposed on the left of the turning axis in a left-right direction of the body frame; a right front wheel disposed on the right of the turning axis in the left-right direction of the body frame; a left shock absorbing mechanism connected to the left front wheel; a right shock absorbing mechanism connected to the right front wheel; a left side member disposed on the left of the turning axis in the left-right direction of the body frame, and that is not turnable in a turning direction of the steering member relative to the body frame; a right side member disposed on the right of the turning axis in the left-right direction of the body frame, and that is not turnable in the turning direction of the steering member relative to the body frame; a left turning portion supporting the left shock absorbing mechanism, and that is turnable relative to the left side member; a right turning portion supporting the right shock absorbing mechanism, and that is turnable relative to the right side member; an intermediate turning portion that is turnable relative to the body frame in accordance with turning of the steering member; a connecting mechanism connecting the intermediate turning portion with the left turning portion and the right turning portion, and that causes the left turning portion and the right turning portion to turn in association with turning of the intermediate turning portion; and an excessive torque restricting mechanism that restricts: a magnitude of a torque that is transmitted from the steering member to the connecting mechanism; a magnitude of a torque that is transmitted from the left shock absorbing mechanism to the connecting mechanism; and a magnitude of a torque that is transmitted from the right shock absorbing mechanism to the connecting mechanism.

The connecting mechanism, which connects the left turning portion and the right turning portion that are spaced from each other, is elongated in the left-right direction and has a relatively large movable range. The inventors of the present invention have discovered that the attempt to enhance the rigidity of the connecting mechanism would result in the enlargement of the structure and the movable range thereof, so that the size of the vehicle tends to be enlarged. In other words, the inventors have discovered that, if it is possible to reduce the necessity of enhancing the rigidity of the connecting mechanism, the size of the connecting mechanism and the movable range thereof is reduced, so that the vehicle is made compact. In addition, the inventors have discovered that, in the case of the vehicle including the left shock absorbing mechanism and the right shock absorbing mechanism which are connected to the left front wheel and the right front wheel, respectively, the torque which is transmitted to the connecting mechanism as a load includes three systems including a system which is transmitted from the steering member to the left front wheel and the right front wheel, a system which is transmitted from the left shock absorbing mechanism to the steering member, and a system which is transmitted from the right shock absorbing mechanism to the steering member.

With the above configuration, the excessive torque restricting mechanism restricts all of the three systems of torque which are transmitted to the connecting mechanism. Accordingly, it is possible to reduce the load transmitted to the connecting mechanism, so that it is possible to reduce the necessity of enhancing the rigidity of the connecting mechanism as a countermeasure against the load. As a result, it is possible to make the connecting mechanism small in size. This reduces the size of the vehicle which includes the power source, the leanable body frame, and the two front wheels which are disposed so as to be arranged side by side in the left-right direction of the body frame.

The excessive torque restricting mechanism preferably transmits the torque, which is transmitted from the steering member to the connecting mechanism, to the body frame via the intermediate turning portion; transmits the torque, which is transmitted from the left shock absorbing mechanism to the connecting mechanism, to the left side member via the left turning portion; and transmits the torque, which is transmitted from the right shock absorbing mechanism to the connecting mechanism, to the right side member via the right turning portion.

Namely, the torques which are restricted by the excessive torque restricting mechanism are released individually via the intermediate turning portion, the left turning portion and the right turning portion to the body frame, and the left side member and the right side member which are turnable relative to each other. By using this configuration, it is possible to take countermeasures against the torque while further reducing the necessity of enhancing the rigidity of the connecting mechanism. As a result, it is possible to make the connecting mechanism smaller in size. This reduces further the size of the vehicle which includes the power source, the leanable body frame, and the two front wheels which are arranged side by side in the left-right direction of the body frame.

The excessive torque restricting mechanism preferably includes an intermediate restricting portion that transmit the torques, which is transmitted from the steering member to the connecting mechanism, to the body frame by restricting turning of the intermediate turning portion relative to the body frame; a left restricting portion that transmits the torque, which is transmitted from the left shock absorbing mechanism to the connecting mechanism, to the left side member by restricting turning of the left turning portion relative to the left side member; and a right restricting portion that transmits the torque, which is transmitted from the right shock absorbing mechanism to the connecting mechanism, to the right side member by restricting turning of the right turning portion relative to the right side member.

With this configuration, it is possible to cause the excessive torque restricting mechanism that restricts the three systems of torque which are transmitted to the connecting mechanism to serve also as a stopper to restrict turning amounts of the respective turnable members. This not only reduces the necessity of enhancing the rigidity of the connecting mechanism but also reduces the size in construction of the connecting mechanism compared with a case where the excessive torque restricting mechanism and the stopper are provided separately. Consequently, it is possible to reduce further the size of the vehicle which includes the power source, the leanable body frame, and the two front wheels which are arranged side by side in the left-right direction of the body frame.

The vehicle preferably includes a link mechanism that causes the body frame to lean from the upright state to the left or to the right by changing positions of the left front wheel and the right front wheel relative to the body frame. In this case, the excessive torque restricting mechanism preferably includes a left steering restricting mechanism that restricts a magnitude of a torque, which is transmitted from the steering member to the connecting mechanism, when a leaning angle of the body frame from an upright state thereof to the left exceeds a predetermined value; and a right steering restricting mechanism that restricts a magnitude of a torque, which is transmitted from the steering member to the connecting mechanism, when a leaning angle of the body frame from the upright state thereof to the right exceeds a predetermined value.

When steering is executed in such a state that the relative positions of the left front wheel and the right front wheel to the body frame is caused to lean relative to the vertical direction, the load which is exerted on the connecting mechanism via the steering member becomes very large. According to the configuration described above, the magnitude of the torque which is transmitted from the steering member to the connecting mechanism is restricted by the right steering restricting portion and the left steering restricting portion, and therefore, the necessity is reduced to enhance the rigidity of the connecting mechanism. As a result, it is possible to make the connecting mechanism smaller in size. This reduces further the size of the vehicle which includes the power source, the leanable body frame, and the two front wheels which are arranged side by side in the left-right direction of the body frame.

The link mechanism preferably includes an upper cross member, and a lower cross member disposed below the upper cross member. In this case, the upper cross member, the lower cross member, the left side member, and the right side member are connected such that the upper cross member and the lower cross member are held in postures which are parallel to each other, and that the left side member and the right side member are held in postures which are parallel to each other; the left steering restricting mechanism includes a left recess provided in one of the lower cross member and the left turning portion, and a left projection provided on the other one of the lower cross member and the left turning portion; the right steering restricting mechanism includes a right recess provided in one of the lower cross member and the right turning portion, and a right projection provided on the other one of the lower cross member and the right turning portion; in a case where the leaning angle of the body frame from the upright state thereof to the left or to the right is a first leaning angle, when turning of the steering member reaches a first turning angle, the turning of the steering member is restricted by the left projection brought into abutment with an internal surface of the left recess or the right projection brought into abutment with an internal surface of the right recess; and in a case where the leaning angle of the body frame from the upright state thereof to the left or to the right is a second leaning angle which is larger than the first leaning angle, when the turning of the steering member reaches a second turning angle which is smaller than the first turning angle, the turning of the steering member is restricted by the left projection brought into abutment with an internal surface of the left recess or the right projection brought into abutment with an internal surface of the right recess.

With this configuration, when the steering member is turned to some extent under a condition that the vehicle is caused to lean to some extent, either the left projection or the right projection comes into abutment with an internal surface of the left recess or the right recess, respectively. In a case where the leaning angle of the vehicle is larger, either the left projection or the right projection comes into abutment with an internal surface of the left recess or the right recess, respectively, under a condition that the turning angle of the steering member is smaller. When the left projection or the right projection comes into abutment with the internal surface of the left recess or the right recess, respectively, the turning of the steering member is restricted as well as the turning of the left turning portion and the right turning portion are restricted. Namely, the extent where the both front wheels are restricted from turning or the steering member is restricted from turning is changed according to the magnitude of the leaning angle of the vehicle. Consequently, the restriction on the load exerted on the connecting mechanism is executed properly according to the leaning angle of the body frame and the steering angle, and therefore, it is possible to reduce further the necessity of enhancing the rigidity of the connecting mechanism. As a result, it is possible to make the connecting mechanism smaller in size. This reduces further the size of the vehicle which includes the power source, the leanable body frame, and the two front wheels which are arranged side by side in the left-right direction of the body frame.

The vehicle is preferably configured such that the left recess and the right recess are provided in the lower cross member; the left projection is provided on the left turning portion to define a portion of the left restricting portion; and the right projection is provided on the right turning portion to define a portion of the right restricting portion.

In other words, the portion of the left steering restricting portion serves as the left restricting portion, while the portion of the right steering restricting portion serves as the right restricting portion. With this configuration, the number of parts is decreased, thus making the restricting mechanism small in size. Consequently, the vehicle including the power source, the leanable body frame, and the two front wheels which are arranged side by side in the left-right direction of the body frame is made small in size while reducing the size of the connecting mechanism.

The vehicle is preferably configured such that the left recess and the right recess are provided in the lower cross member; the left projection is provided on the left turning portion; the right projection is provided on the right turning portion; the left projection is located outside the left recess when the body frame is in the upright state thereof; and the right projection is located outside the right recess when the body frame is in the upright state thereof.

The intermediate turning portion restricts the magnitude of torque transmitted from the steering member to the connecting mechanism when the body frame is not caused to lean. Consequently, the sizes of the left recess and the right recess which restrict the steering member from turning when the body frame is leaning is made as small as possible. In other words, it is possible to make the size of a wall portion, which separates the left recess from the right recess on the lower cross member, as small as possible. Thus, the size of the lower cross member is reduced while ensuring the rigidity which is required for the wall portion. Consequently, the vehicle including the power source, the leanable body frame, and the two front wheels which are arranged side by side in the left-right direction of the body frame is made small in size while reducing the size of the connecting mechanism.

The vehicle is preferably configured such that the left recess and the right recess are provided in the lower cross member; the left turning portion includes a left bracket provided with a portion supporting the left shock absorbing mechanism, and with a portion supporting the left projection which is a separate member; and the right turning portion includes a right bracket provided with a portion supporting the right shock absorbing mechanism, and with a portion supporting the right projection which is a separate member.

In this case, compared with a case where the portion which restricts the turning of the steering member and the portions which support the shock absorbing mechanisms are integral and unitary (monolithic), the left bracket and the right bracket are able to be produced at a low cost and with high accuracy. This enables accurate determination of the turning extents of the left turning portion and the right turning portion. Accordingly, inner circumferential surfaces of the body covers, which accommodate these mechanisms, lie as close to the turning extents as possible, thus making it possible to reduce the size of the body cover. Consequently, the vehicle including the power source, the leanable body frame, and the two front wheels which are arranged side by side in the left-right direction of the body frame is made small in size while reducing the size of the connecting mechanism.

The vehicle is preferably configured such that the left bracket includes a portion supporting a left turning member which is supported by the left side member; the portion supporting the left turning member and the portion supporting the left shock absorbing mechanism overlap when viewed from a direction perpendicular or substantially perpendicular to a direction that the left side member extends; and the right bracket includes a portion supporting a right turning member which is supported by the right side member; the portion supporting the right turning member and the portion supporting the right shock absorbing mechanism overlap when viewed from a direction perpendicular or substantially perpendicular to a direction that the right side member extends.

With the above configuration, the shapes of the left bracket and the right bracket are made into simpler shapes which are based on flat planes. Consequently, it is possible to reduce the size of the vehicle which includes the power source, the leanable body frame, and the two front wheels which are arranged side by side in the left-right direction of the body frame while restricting the fabrication costs and enhancing the ease with which the dimensions are controlled.

Each of the left shock absorbing mechanism and the right shock absorbing mechanism may include a plurality of telescopic mechanisms.

According to this configuration, the construction weight on the periphery of each front wheel is increased instead of enhancing the shock absorbing performance. Consequently, although the turning moment of each of the front wheels that is associated with steering or turning becomes large, the increase in the load exerted on the connecting mechanism is restricted by the excessive torque restricting portion. Accordingly, the necessity for enhancing the rigidity of the connecting mechanism is further reduced. As a result, it is possible to make the connecting mechanism smaller in size. This reduces further the size of the vehicle which includes the power source, the leanable body frame, and the two front wheels which are arranged side by side in the left-right direction of the body frame.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
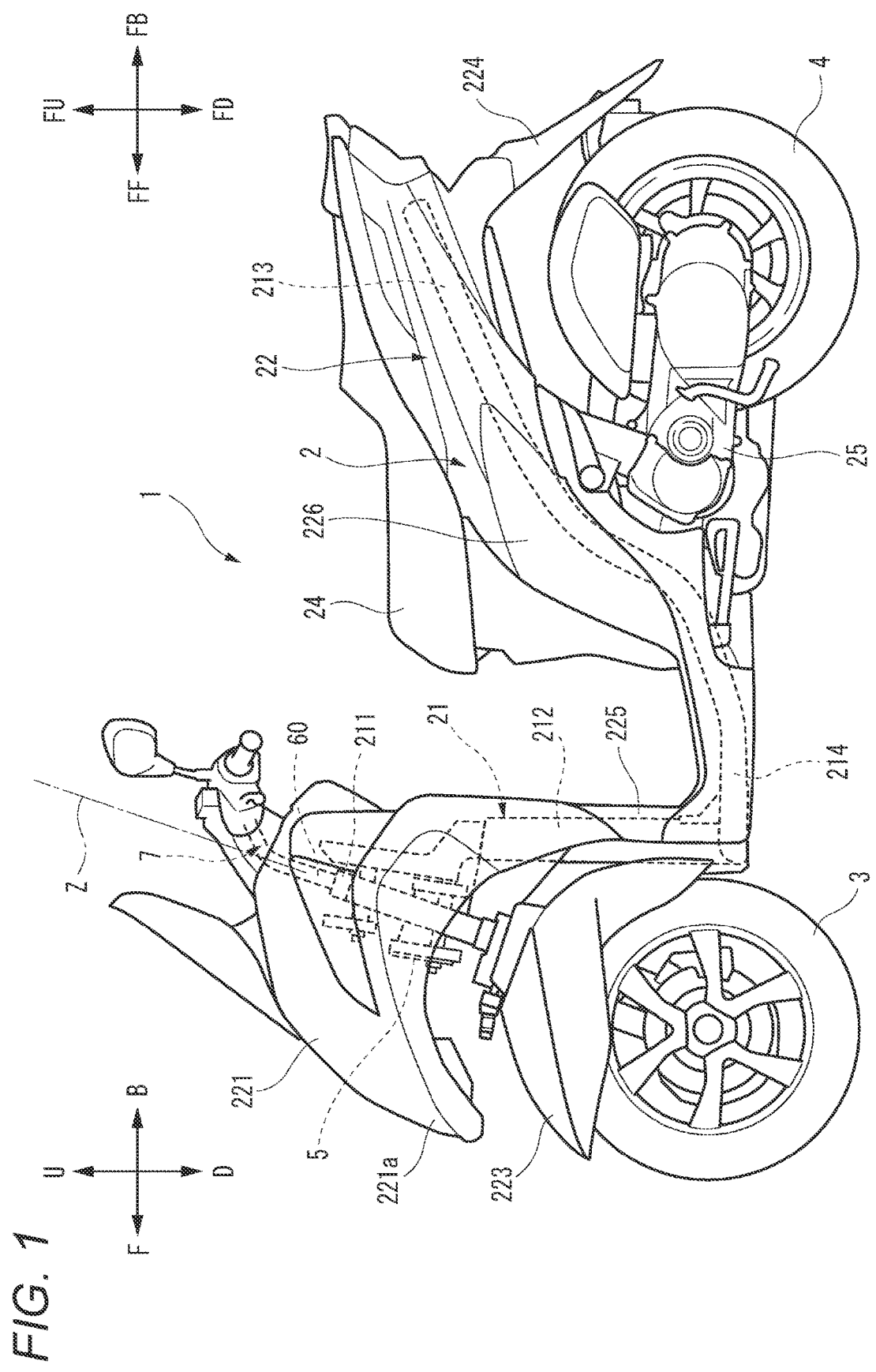
FIG. 1 is an entire view of a vehicle according to a preferred embodiment of the present invention, viewed from the left thereof.

Referring to the accompanying drawings, the present invention will be described in detail below based on preferred embodiments thereof.

In the accompanying drawings, an arrow F denotes a front or forward direction of a vehicle. An arrow B denotes a back/rear or backward/rearward direction of the vehicle. An arrow U denotes an up or upward direction of the vehicle. An arrow D denotes a down or downward direction of the vehicle. An arrow R denotes a right or rightward direction of the vehicle. An arrow L denotes a left or leftward direction of the vehicle.

A vehicle turns with a body frame leaning in a left-right direction of the vehicle relative to a vertical direction. Accordingly, in addition to the directions based on the vehicle, directions based on the body frame will be defined. In the accompanying drawings, an arrow FF denotes a front or forward direction of the body frame. An arrow FB denotes a back/rear or backward/rearward of the body frame. An arrow FU denotes an up or upward direction of the body frame. An arrow FD denotes a down or downward direction of the body frame. An arrow FR denotes a right or rightward direction of the body frame. An arrow FL denotes a left or leftward direction of the body frame.

In this description, a "front-rear direction of the body frame," a "left-right direction of the body frame" and an "up-down direction of the body frame" refer to a front-rear direction, a left-right direction, and an up-down direction based on the body frame as viewed from a rider who rides the vehicle. "A side of or sideways of the body frame" refers to directly on the right or left of the body frame.

In this description, an expression "something extends in the front-rear direction of the body frame" includes a situation in which something extends while being inclined in relation to the front-rear direction of the body frame and means that something extends with a gradient which is closer to the front-rear direction of the body frame rather than the left-right direction and the up-down direction of the body frame.

In this description, an expression "something extends in the left-right direction of the body frame" includes a situation in which something extends while being inclined in relation to the left-right direction of the body frame and means that something extends with a gradient which is closer to the left-right direction of the body frame rather than the front-rear direction of the body frame and the up-down direction of the body frame.

In this description, an expression "something extends in the up-down direction of the body frame" includes a situation in which something extends while being inclined in relation to the up-down direction of the body frame and means that something extends with a gradient which is closer to the up-down direction of the body frame rather than the front-rear direction of the body frame and the left-right direction of the body frame.

In this description, an expression the "body frame is in the upright state" means that the up-down direction of the body frame coincides with the vertical direction in such a state that the vehicle is not steered. In this state, the directions based on the vehicle and the directions based on the vehicle frame coincide. When the vehicle is turning with the body frame leaning in the left-right direction relative to the vertical direction, the left-right direction of the vehicle does not coincide with the left-right direction of the body frame. In addition, the up-down direction of the vehicle does not coincide with the up-down direction of the body frame, either. However, the front-rear direction of the vehicle coincides with the front-rear direction of the body frame.

Referring to FIGS. 1 to 13B, a vehicle 1 according to preferred embodiments of the present invention will be described. The vehicle 1 is driven by power generated from a power source and includes a leanable body frame and two front wheels which are arranged side by side in the left-right direction of the body frame.

FIG. 1 is a left side view wherein the whole of the vehicle 1 is viewed from the left side thereof. The vehicle 1 includes a vehicle main body 2, a pair of left and right front wheels 3, a rear wheel 4, a link mechanism 5, and a steering member 7.

The vehicle main body 2 includes a body frame 21, a body cover 22, a seat 24, and a power unit 25. In FIG. 1, the body frame 21 is in an upright state. The following description which refers to FIG. 1 will be made on the premise that the body frame 21 is in the upright state.

The body frame 21 includes a head pipe 211, a down frame 212, and a rear frame 213. In FIG. 1, portions of the body frame 21 which are hidden by the body cover 22 are shown by dashed lines. The body frame 21 supports the seat 24 and the power unit 25. The power unit 25 supports the rear wheel 4. The power unit 25 includes a power source such as an engine, an electric motor, a battery or the like and a device such as a transmission. The power source produces a force by which the vehicle 1 is driven.

The head pipe 211 is disposed at a front portion of the vehicle 1. When the body frame 21 is viewed from the left thereof, an upper portion of the head pipe 211 is disposed behind a lower portion of the head pipe 211.

The down frame 212 is connected to the head pipe 211. The down frame 212 is disposed directly behind the head pipe 211. The down frame 212 extends in the up-down direction of the body frame 21.

The rear frame 213 is disposed directly behind the down frame 212. The rear frame 213 extends in the front-rear direction of the body frame 21. The rear frame 213 supports the seat 24 and the power unit 25.

The body cover 22 includes a front cover 221, a pair of left and right front fenders 223, a rear fender 224, and a leg shield 225. The body cover 22 is a body portion which covers at least partially body portions which are mounted on the vehicle 1 such as the pair of left and right front wheels 3, the body frame 21, the link mechanism 5 and the like.

The front cover 221 is disposed ahead of the seat 24. The front cover 221 covers at least partially the link mechanism 5 and the steering member 7.

At least portions of the pair of left and right front fenders 223 are disposed directly below the front cover 221. At least the portions of the pair of left and right front fenders 223 are disposed directly above the pair of left and right front wheels 3, respectively.

At least a portion of the rear fender 224 is disposed directly above the rear wheel 4.

The leg shield 225 is disposed in a position where the leg shield 225 covers at least partially the legs of the rider. The leg shield 225 is disposed behind the pair of left and right front wheels 3 and ahead of the seat 24.

At least portions of the pair of left and right front wheels 3 are disposed directly below the head pipe 211. At least portions of the pair of left and right front wheels 3 are disposed directly below the front cover 221.

At least a portion of the rear wheel 4 is disposed below the seat 24. At least a portion of the rear wheel 4 is disposed directly below the rear fender 224.

Figure 2:
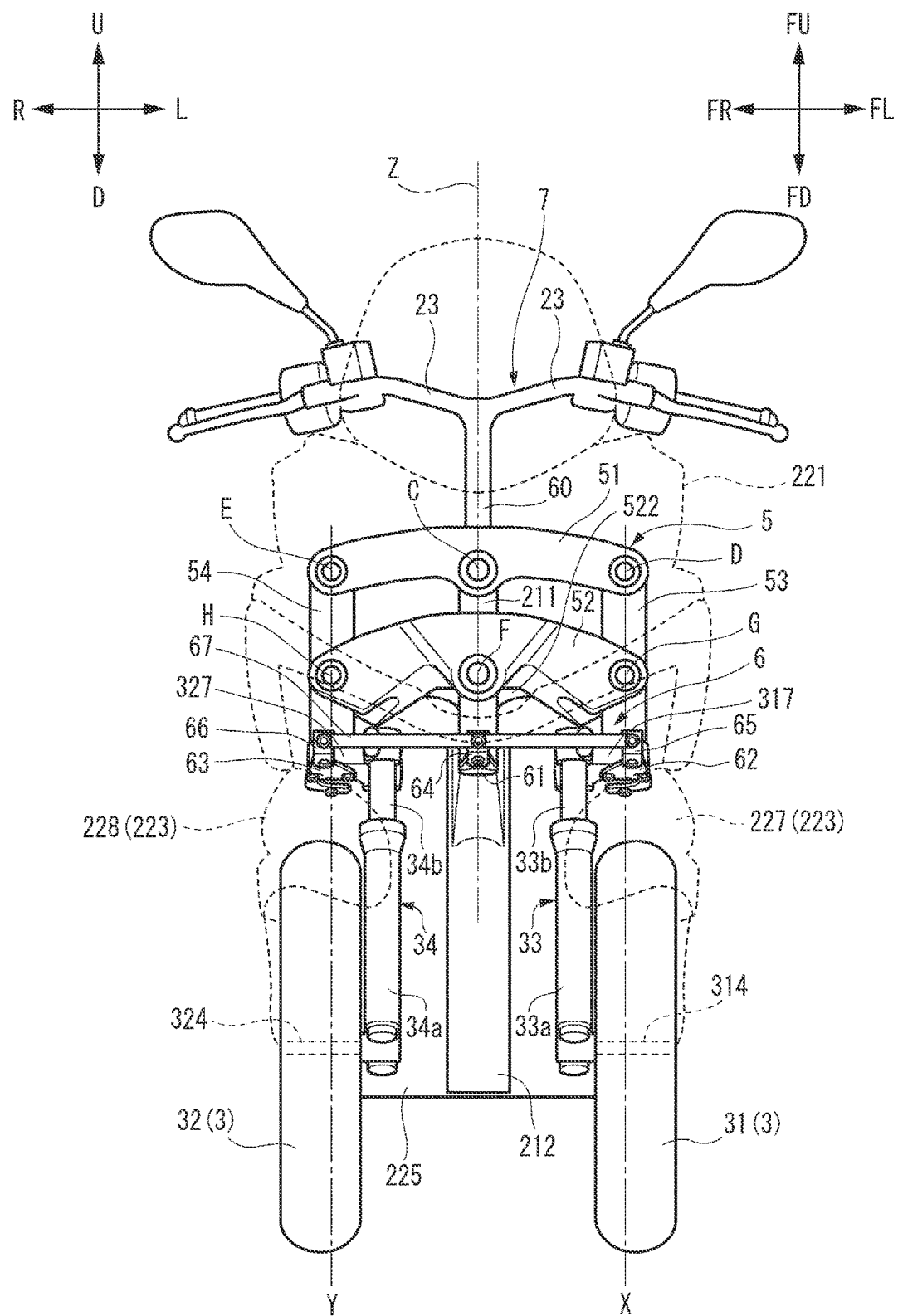
FIG. 2 is a front view showing a front portion of the vehicle of FIG. 1.

FIG. 2 is a front view of the front portion of the vehicle 1 as viewed from the front of the body frame 21. In FIG. 2, the body frame 21 is in the upright state. The following description which refers to FIG. 2 will be made on the premise that the body frame 21 is in the upright state. In FIG. 2, those elements shown therein are depicted as being seen through the front cover 221 and the pair of left and right front fenders 223 which are shown by dashed lines.

The pair of left and right front wheels 3 include a left front wheel 31 and a right front wheel 32. The left front wheel 31 is disposed on the left of the head pipe 211 which defines a portion of the body frame 21. The right front wheel 32 is disposed on the right of the head pipe 211. The left front wheel 31 and the right front wheel 32 are arranged side by side in the left-right direction of the body frame 21.

The steering member 7 includes a left shock absorbing mechanism 33, a right shock absorbing mechanism 34, a left bracket 317, and a right bracket 327.

The left shock absorbing mechanism 33 includes a left outer tube 33a. The left outer tube 33a supports the left front wheel 31. The left outer tube 33a extends in the up-down direction of the body frame 21. The left outer tube 33a includes a left supporting axle 314 at a lower end portion thereof. The left front wheel 31 is supported by the left supporting axle 314.

The left shock absorbing mechanism 33 includes a left inner tube 33b. The left inner tube 33b extends in the up-down direction of the body frame 21. The left inner tube 33b is disposed directly above the left outer tube 33a in such a state that a portion of the left inner tube 33b is inserted in the left outer tube 33a. An upper portion of the left inner tube 33b is fixed to the left bracket 317.

The left shock absorbing mechanism 33 is a so-called telescopic shock absorbing mechanism. The left inner tube 33b moves relatively to the left outer tube 33a in a direction in which the left outer tube 33a extends, so that the left shock absorbing mechanism 33 is allowed to extend and contract in the extending direction of the left outer tube 33a. This enables the left shock absorbing mechanism 33 to absorb a displacement of the left front wheel 31 relative to the left inner tube 33b in the up-down direction of the body frame 21.

The left outer tube 33a and the left inner tube 33b define a pair of telescopic elements which are side by side in the front-rear direction of the body frame 21.

The right shock absorbing mechanism 34 includes a right outer tube 34a. The right outer tube 34a supports the right front wheel 32. The right outer tube 34a extends in the up-down direction of the body frame 21. The right outer tube 34a includes a right supporting axle 324 at a lower end portion thereof. The right front wheel 32 is supported by the right supporting axle 324.

The right shock absorbing mechanism 34 includes a right inner tube 34b. The right inner tube 34b extends in the up-down direction of the body frame 21. The right inner tube 34b is disposed directly above the right outer tube 34a in such a state that a portion thereof is inserted in the right outer tube 34a. An upper portion of the right inner tube 34b is connected to a right bracket 327.

The right shock absorbing mechanism 34 is a so-called telescopic shock absorbing mechanism. The right inner tube 34b moves relatively to the right outer tube 34a in a direction in which the right outer tube 34a extends, so that the right shock absorbing mechanism 34 is allowed to extend and contract in the extending direction of the right outer tube 34a. This enables the right shock absorbing mechanism 34 to absorb a displacement of the right front wheel 32 relative to the right inner tube 34b in the up-down direction of the body frame 21.

The right outer tube 34a and the right inner tube 34b define a pair of telescopic elements which are arranged side by side in the front-rear direction of the body frame 21.

The steering member 7 includes a steering force transmitting mechanism 6. The steering force transmitting mechanism 6 includes a handlebar 23 and a steering shaft 60. The handlebar 23 is attached to an upper portion of the steering shaft 60. A portion of the steering shaft 60 is turnably supported on the head pipe 211. A central turning axis Z of the steering shaft 60 extends in the up-down direction of the body frame 21. As shown in FIG. 1, the upper portion of the steering shaft 60 is disposed behind a lower portion thereof. Consequently, the central turning axis Z of the steering shaft 60 is inclined in the front-rear direction of the body frame 21. The steering shaft 60 turns about the central turning axis Z in response to the rider operating the handlebar 23.

The steering force transmitting mechanism 6 transmits a steering force with which the rider operates the handlebar 23 to the left bracket 317 and the right bracket 327. A specific configuration of the steering force transmitting mechanism 6 will be described in detail below.

In the vehicle 1 according to this preferred embodiment, the link mechanism 5 uses a four parallel joint link system (also referred to as a parallelogram link).

As shown in FIG. 2, the link mechanism 5 is disposed below the handlebar 23. The link mechanism 5 is disposed above the left front wheel 31 and the right front wheel 32. The link mechanism 5 includes an upper cross member 51, a lower cross member 52, a left side member 53, and a right side member 54. The link mechanism 5 never turns about the central turning axis Z relative to the body frame 21 irrespective of the turning of the steering shaft 60 turning about the central turning axis Z in association with the operation of the handlebar 23.

The upper cross member 51 includes a plate member 512. The plate member 512 is disposed directly ahead of the head pipe 211. The plate member 512 extends in the left-right direction of the body frame 21.

An intermediate portion of the upper cross member 51 is supported on the head pipe 211 by a support portion C. The upper cross member 51 turns relative to the head pipe 211 about an intermediate upper axis which passes through the support portion C and extends in the front-rear direction of the body frame 21.

A left end portion of the upper cross member 51 is supported on the left side member 53 by a support portion D. The upper cross member 51 turns relative to the left side member 53 about a left upper axis which passes through the support portion D and extends in the front-rear direction of the body frame 21.

A right end portion of the upper cross member 51 is supported on the right side member 54 by a support portion E. The upper cross member 51 turns relative to the right side member 54 about a right upper axis which passes through the support portion E and extends in the front-rear direction of the body frame 21.

Figure 3:
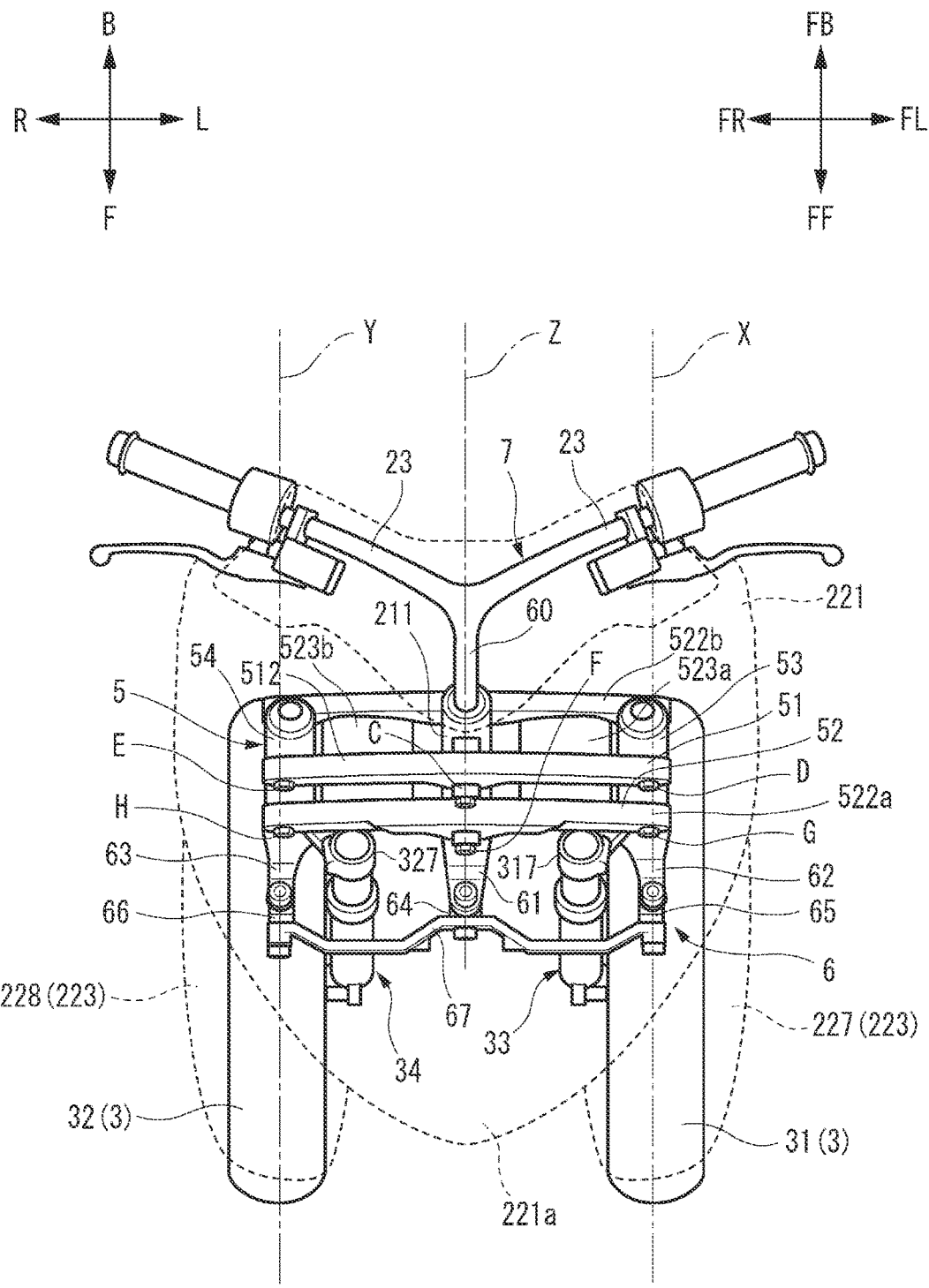
FIG. 3 is a plan view showing the front portion of the vehicle of FIG. 1.

FIG. 3 is a plan view of the front portion of the vehicle 1 as viewed from the above the body frame 21. In FIG. 3, the body frame 21 is in the upright state. The following description which refers to FIG. 3 will be made on the premise that the body frame 21 is in the upright state. In FIG. 3, those elements shown therein are depicted as being seen through the front cover 221 and the pair of front fenders 223 which are shown by dashed lines.

As shown in FIG. 3, the lower cross member 52 includes a front plate member 522a and a rear plate member 522b. The front plate member 522a is disposed directly ahead of the head pipe 211. The rear plate member 522b is disposed directly behind the head pipe 211. The front plate member 522a and the rear plate member 522b extend in the left-right direction of the body frame 21. The lower cross member 52 is disposed below the upper cross member 51. A lengthwise dimension of the lower cross member 52 in relation to the left-right direction of the body frame 21 is exactly or almost the same as a lengthwise dimension of the upper cross member 51 in relation to the left-right direction of the body frame 21. The lower cross member 52 extends parallel to the upper cross member 51.

An intermediate portion of the lower cross member 52 is supported on the head pipe 211 by a support portion F. The lower cross member 52 turns about an intermediate lower axis which passes through the support portion F and extends in the front-rear direction of the body frame 21.

A left end portion of the lower cross member 52 is supported on the left side member 53 by a support portion G. The lower cross member 52 turns about a left lower axis which passes through the support portion G and extends in the front-rear direction of the body frame 21.

A right end portion of the lower cross member 52 is supported on the right side member 54 by a support portion H. The lower cross member 52 turns about a right lower axis which passes through the support portion H and extends in the front-rear direction of the body frame 21.

The intermediate upper axis, the right upper axis, the left upper axis, the intermediate lower axis, the right lower axis, and the left lower axis extend parallel to one another. The intermediate upper axis, the right upper axis, the left upper axis, the intermediate lower axis, the right lower axis, and the left lower axis are disposed above the left front wheel 31 and the right front wheel 32.

Figure 4A:
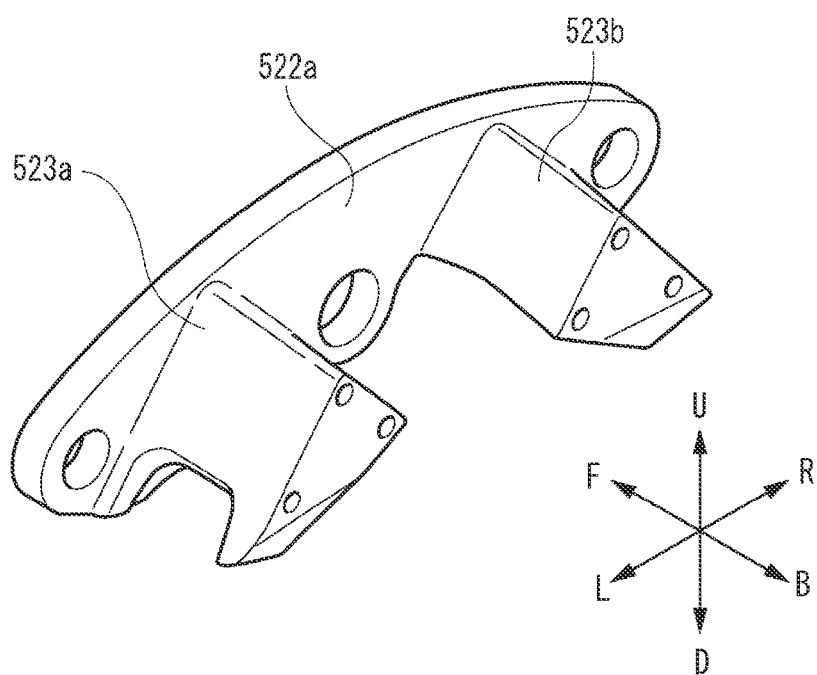
FIGS. 4A and 4B are views showing the configuration of a portion of a lower cross member in the vehicle of FIG. 1.

As shown in FIG. 4A, the front plate member 522a is integral and unitary (monolithic) with a left connecting block 523a and a right connecting block 523b. In the front plate member 522a, a through hole which defines a portion of the support portion F is between the left connecting block 523a and the right connecting block 523b. A through hole which defines a portion of the support portion G is directly on the left of the left connecting block 523a. A through hole which defines a portion of the support portion H is directly on the right of the right connecting block 523b. The rear plate member 522b is fixed to respective distal end surfaces of the left connecting block 523a and the right connecting block 523b by appropriate fastening members.

Figure 4B:
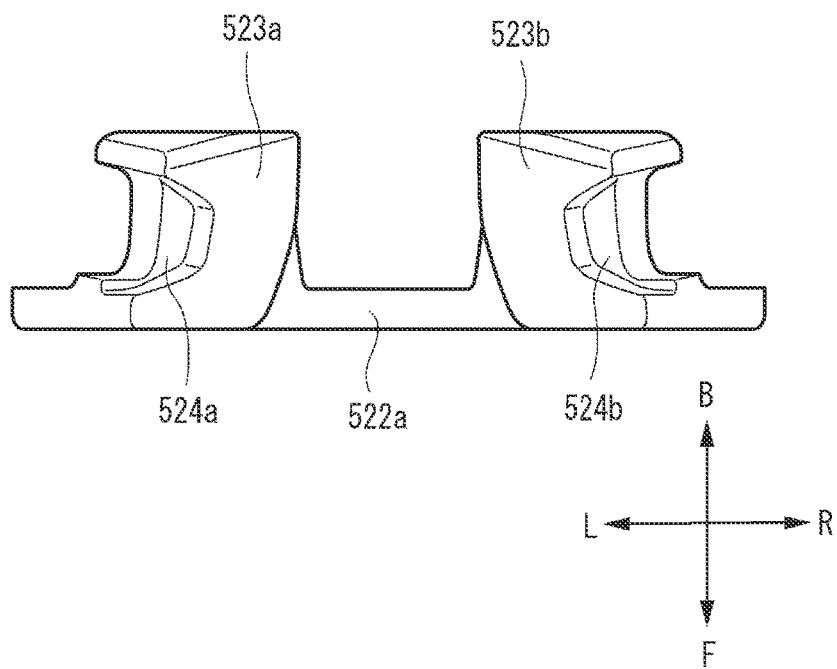

As shown in FIG. 4B, a left recess 524a is provided at a lower portion of the left connecting block 523a in such a way that a width becomes narrower in the front-rear direction as it extends upwards. Similarly, a right recess 524b is provided at a lower portion of the right connecting block 523b in such a way that a width becomes narrower in relation to the front-rear direction as it extends upwards.

As shown in FIGS. 2 and 3, the left side member 53 is disposed directly on the left of the head pipe 211. The left side member 53 is disposed above the left front wheel 31. The left side member 53 extends in a direction in which the head pipe 211 extends. The left side member 53 extends in a direction in which the central turning axis Z of the steering shaft 60 extends. An upper portion of the left side member 53 is disposed behind a lower portion thereof.

The lower portion of the left side member 53 is connected to the left bracket 317. The left bracket 317 turns about a left center axis X relative to the left side member 53. The left center axis X extends in a direction in which the left side member 53 extends. As shown in FIG. 2, the left center axis X extends parallel to the central turning axis Z of the steering shaft 60 in the up-down direction of the body frame 21. As shown in FIG. 3, the left center axis X extends parallel to the central turning axis Z of the steering shaft 60 in the front-rear direction of the body frame 21.

As shown in FIGS. 2 and 3, the right side member 54 is disposed directly on the right of the head pipe 211. The right side member 54 is disposed above the right front wheel 32. The right side member 54 extends in the direction in which the head pipe 211 extends. The right side member 54 extends in the direction in which the central turning axis Z of the steering shaft 60 extends. An upper portion of the right side member 54 is disposed behind a lower portion thereof.

A lower portion of the right side member 54 is connected to the right bracket 327. The right bracket 327 turns about a right center axis Y relative to the right side member 54. The right center axis Y extends in a direction in which the right side member 54 extends. As shown in FIG. 2, the right center axis Y extends parallel to the central turning axis Z of the steering shaft 60 in the up-down direction of the body frame 21. As shown in FIG. 3, the right center axis Y extends parallel to the central turning axis Z of the steering shaft 60 in the front-rear direction of the body frame 21.

Thus, as has been described above, the upper cross member 51, the lower cross member 52, the left side member 53, and the right side member 54 are supported on the body frame 21 so that the upper cross member 51 and the lower cross member 52 are held in postures which are parallel to each other and so that the left side member 53 and the right side member 54 are held in postures which are parallel to each other.

As shown in FIGS. 2 and 3, the steering force transmitting mechanism 6 includes, in addition to the handlebar 23 and the steering shaft 60 which have been described above, an intermediate transmission plate 61, a left transmission plate 62, a right transmission plate 63, an intermediate joint 64, a left joint 65, a right joint 66, and a tie rod 67.

The intermediate transmission plate 61 is connected to the lower portion of the steering shaft 60. The intermediate transmission plate 61 cannot turn relatively to the steering shaft 60. The intermediate transmission plate 61 turns about the intermediate turning axis Z of the steering shaft 60 relative to the head pipe 211. A front portion of the intermediate transmission plate 61 is narrower in relation to a width in the left-right direction of the body frame 21 than a rear portion thereof.

The left transmission plate 62 is disposed directly on the left of the intermediate transmission plate 61. The left transmission plate 62 is connected to a lower portion of the left bracket 317. The left transmission plate 62 cannot turn relative to the left bracket 317. The left transmission plate 62 turns about the left center axis X relative to the left side member 53. A front portion of the left transmission plate 62 is narrower in relation to a width in the left-right direction of the body frame 21 than a rear portion thereof.

The right transmission plate 63 is disposed directly on the right of the intermediate transmission plate 61. The right transmission plate 63 is connected to a lower portion of the right bracket 327. The right transmission plate 63 cannot turn relatively to the right bracket 327. The right transmission plate 63 turns about the right center axis Y relative to the right side member 54. A front portion of the right transmission plate 63 is narrower in relation to a width in the left-right direction of the body frame 21 than a rear portion thereof.

Figure 8:
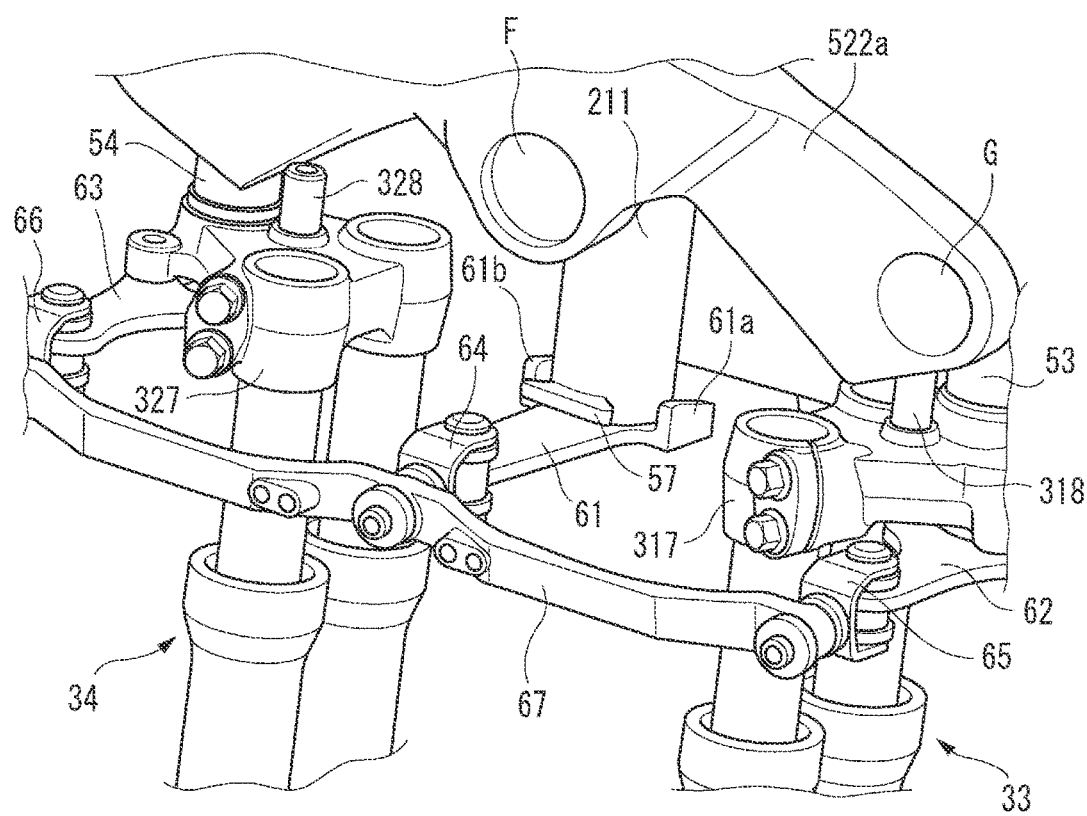
FIG. 8 is a perspective view showing a portion of a steering member in the vehicle of FIG. 1.

As shown in FIGS. 3 and 8, the intermediate joint 64 is connected to the front portion of the intermediate transmission plate 61 via a shaft which extends in the up-down direction of the body frame 21. The intermediate transmission plate 61 and the intermediate joint 64 turn relatively about the shaft portion. The left joint 65 is disposed directly on the left of the intermediate joint 64. The left joint 65 is connected to the front portion of the left transmission plate 62 via a shaft which extends in the up-down direction of the body frame. The left transmission plate 62 and the left joint 65 turn relatively about the shaft portion. The right joint 66 is disposed directly on the right of the intermediate joint 64. The right joint 66 is connected to the front portion of the right transmission plate 63 via a shaft which extends in the up-down direction of the body frame. The right transmission plate 63 and the right joint 66 turn relatively about the shaft portion.

A shaft portion which extends in the front-rear direction of the body frame 21 is provided at a front portion of the intermediate joint 64. A shaft portion which extends in the front-rear direction of the body frame 21 is provided at a front portion of the left joint 65. A shaft portion which extends in the front-rear direction of the body frame 21 is provided at a front portion of the right joint 66. The tie rod 67 extends in the left-right direction of the body frame 21. The tie rod 67 is connected to the intermediate joint 64, the left joint 65, and the right joint 66 via those shaft portions. The tie rod 67 and the intermediate joint 64 turn relatively about the shaft portion which is provided at the front portion of the intermediate joint 64. The tie rod 67 and the left joint 65 turn relatively about the shaft portion which is provided at the front portion of the left joint 65. The tie rod 67 and the right joint 66 turn relatively about the shaft portion which is provided at the front portion of the right joint 66.

The left transmission plate 62 is connected to the intermediate transmission plate 61 via the left joint 65, the tie rod 67, and the intermediate joint 64. The right transmission plate 63 is connected to the intermediate transmission plate 61 via the right joint 66, the tie rod 67, and the intermediate joint 64. The left transmission plate 62 and the right transmission plate 63 are connected to each other via the left joint 65, the tie rod 67, and the right joint 66.

Figure 9:
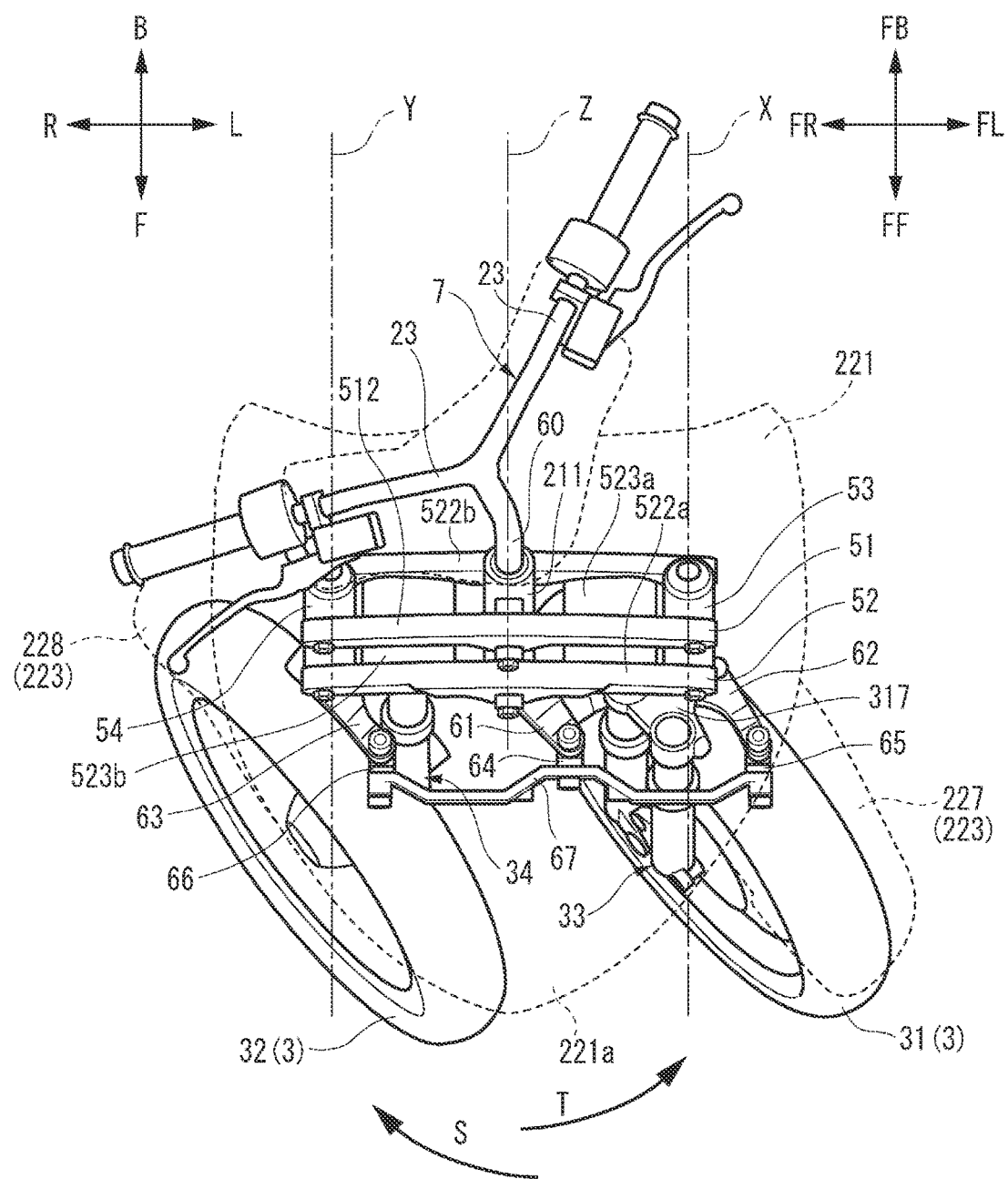
FIG. 9 is a plan view showing the front portion of the vehicle of FIG. 1 when the vehicle is steered.

Next, referring to FIGS. 3 and 9, a steering operation of the vehicle 1 will be described. FIG. 9 is a plan view of the front portion of the vehicle 1 under a condition that the left front wheel 31 and the right front wheel 32 are turned to the left, as viewed from the above the body frame 21. In FIG. 9, those elements shown therein are depicted as being seen through the front cover 221 and the pair of front fenders 223 which are shown by dashed lines.

When the rider operates the handlebar 23, the steering shaft 60 turns about the central turning axis Z relative to the head pipe 211. When the handlebar 23 is turned to the left as shown in FIG. 9, the steering shaft 60 turns in a direction indicated by an arrow T. In association with the turning of the steering shaft 60, the intermediate transmission plate 61 turns in the direction indicated by the arrow T about the central turning axis Z relative to the head pipe 211.

In association with the turning of the intermediate transmission plate 61 in the direction indicated by the arrow T, the intermediate joint 64 of the tie rod 67 turns relative to the intermediate transmission plate 61 in a direction indicated by an arrow S. This moves the tie rod 67 rightwards and rearwards with its posture maintained as it is.

In association with the rightward and rearward movement of the tie rod 67, the left joint 65 and the right joint 66 of the tie rod 67 turn in the direction indicated by the arrow S relative to the left transmission plate 62 and the right transmission plate 63, respectively. This causes the left transmission plate 62 and the right transmission plate 63 to turn in the direction indicated by the arrow T while the tie rod 67 maintains its posture as it is.

When the left transmission plate 62 turns in the direction indicated by the arrow T, the left bracket 317, which cannot turn relative to the left transmission plate 62, turns in the direction indicated by the arrow T about the left center axis X relative to the left side member 53.

When the right transmission plate 63 turns in the direction indicated by the arrow T, the right bracket 327, which cannot turn relative to the right transmission plate 63, turns in the direction indicated by the arrow T about the right center axis Y relative to the right side member 54.

When the left bracket 317 turns in the direction indicated by the arrow T, the left shock absorbing mechanism 33, which is connected to the left bracket 317 via the left inner tube 33b, turns in the direction indicated by the arrow T about the left center axis X relative to the left side member 53. When the left shock absorbing mechanism 33 turns in the direction indicated by the arrow T, the left front wheel 31, which is supported on the left shock absorbing mechanism 33 via the left supporting axle 314, turns in the direction indicated by the arrow T about the left center axis X relative to the left side member 53.

When the right bracket 327 turns in the direction indicated by the arrow T, the right shock absorbing mechanism 34, which is connected to the right bracket 327 via the right inner tube 34b, turns in the direction indicated by the arrow T about the right center axis Y relative to the right side member 54. When the right shock absorbing mechanism 34 turns in the direction indicated by the arrow T, the right front wheel 32, which is supported on the right shock absorbing mechanism 34 via the right supporting axle 324, turns in the direction indicated by the arrow T about the right center axis Y relative to the right side member 54.

When the rider operates the handlebar 23 so as to turn to the right, the elements described above turn in the direction indicated by the arrow S. Since the elements move the other way around in relation to the left-right direction, the detailed description thereof will be omitted here.

Thus, as has been described above, the steering force transmitting mechanism 6 transmits the steering force to the left front wheel 31 and the right front wheel 32 in response to the operation of the handlebar 23 by the rider. The left front wheel 31 and the right front wheel 32 turn about the left center axis X and the right center axis Y, respectively, in the direction corresponding to the direction in which the handlebar 23 is operated by the rider.

Figure 5A:
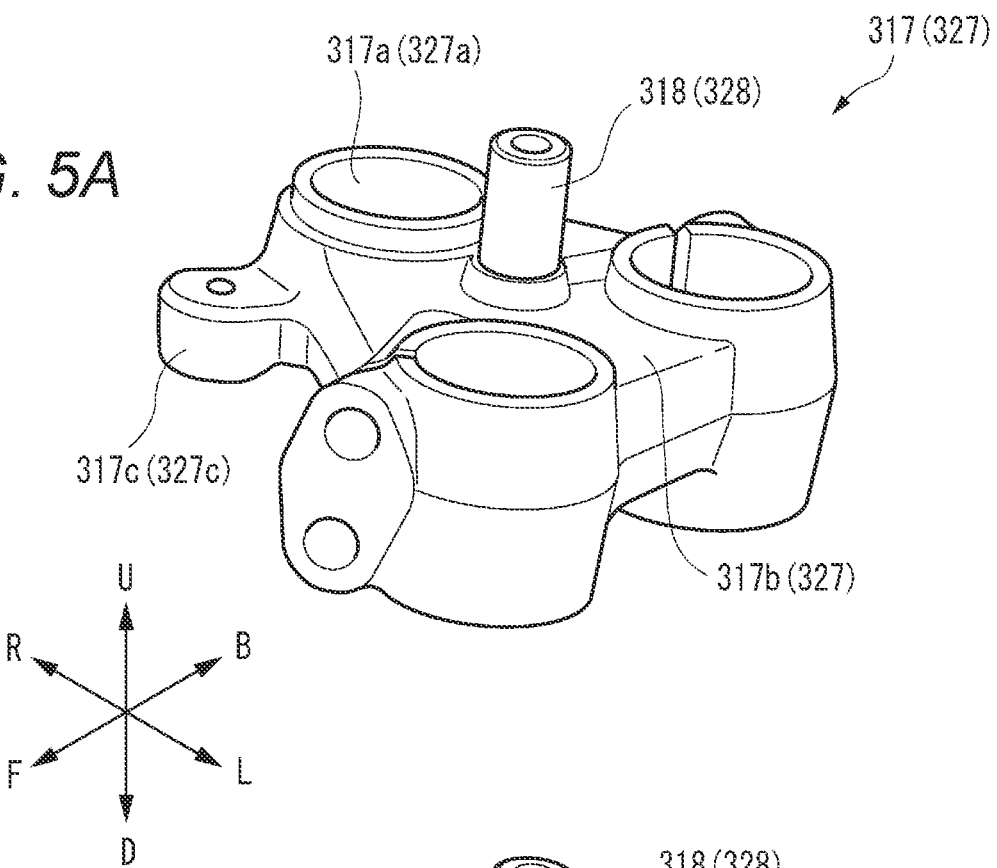
FIGS. 5A and 5B are views showing the configuration of a left bracket and a right bracket in the vehicle of FIG. 1.

Next, referring to FIGS. 5A, 5B, 6A, and 6B, the configuration of the left bracket 317 will be described. FIG. 5A is a perspective view showing an external appearance of the left bracket 317. The left bracket 317 includes a first support portion 317a, a second support portion 317b, a third support portion 317c, and a left turning member 317d.

Figure 6A:
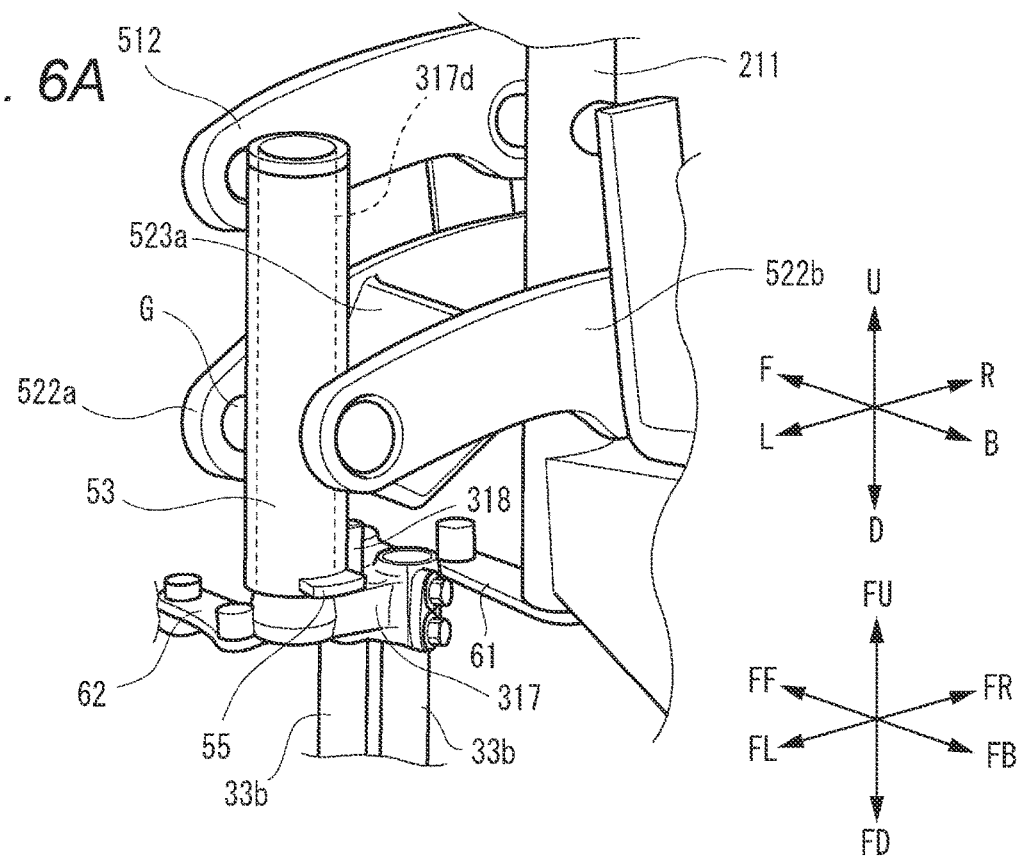
FIGS. 6A and 6B are views showing a positional relationship among the lower cross member, a left side member, and the left bracket in the vehicle of FIG. 1.
Figure 6B:
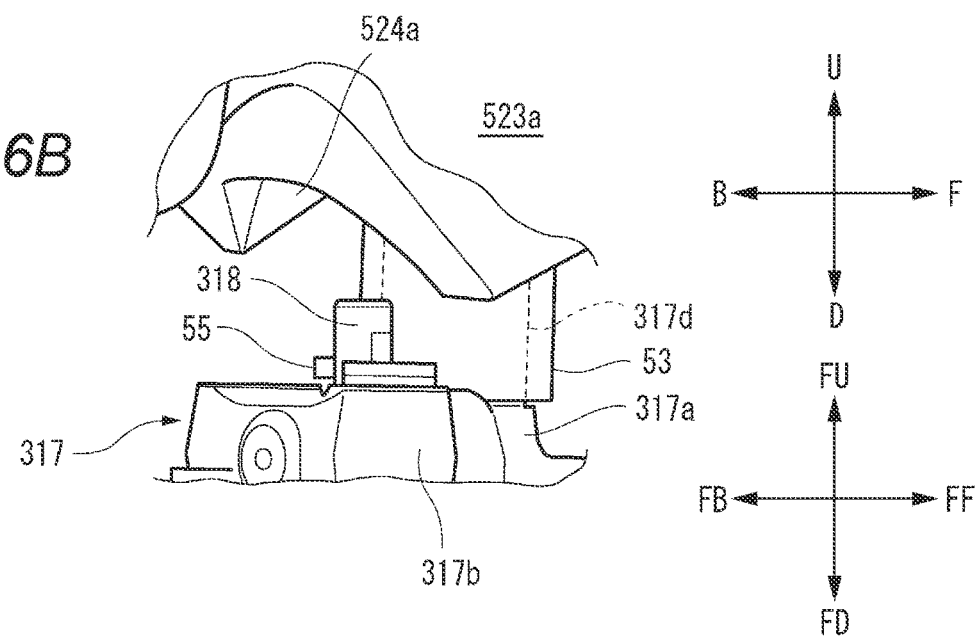

The first support portion 317a is a portion which supports the left turning member 317d which is supported on the left side member 53. As shown in FIG. 6A, the left turning member 317*d* extends through an interior portion of the left side member 53 and is allowed to turn relative to the left side member 53. As shown in FIG. 6B, the left turning member 317*d* is connected to the first support portion 317*a* at a lower portion thereof. This enables the left bracket 317 to turn about the left center axis X.

The second support portion 317*b* is a portion which supports the left shock absorbing mechanism 33. Specifically, the pair of left inner tubes 33*b* of the left shock absorbing mechanism 33 are inserted into a pair of through holes in the second support portion 317*b*, respectively, and are fixed in place by not-shown fastening members.

The third support portion 317*c* is a portion which supports the left transmission plate 62. Specifically, a rear end portion of the left transmission plate 62 is fixed to the third support portion 317*c* with a not-shown fastening member.

Figure 5B:
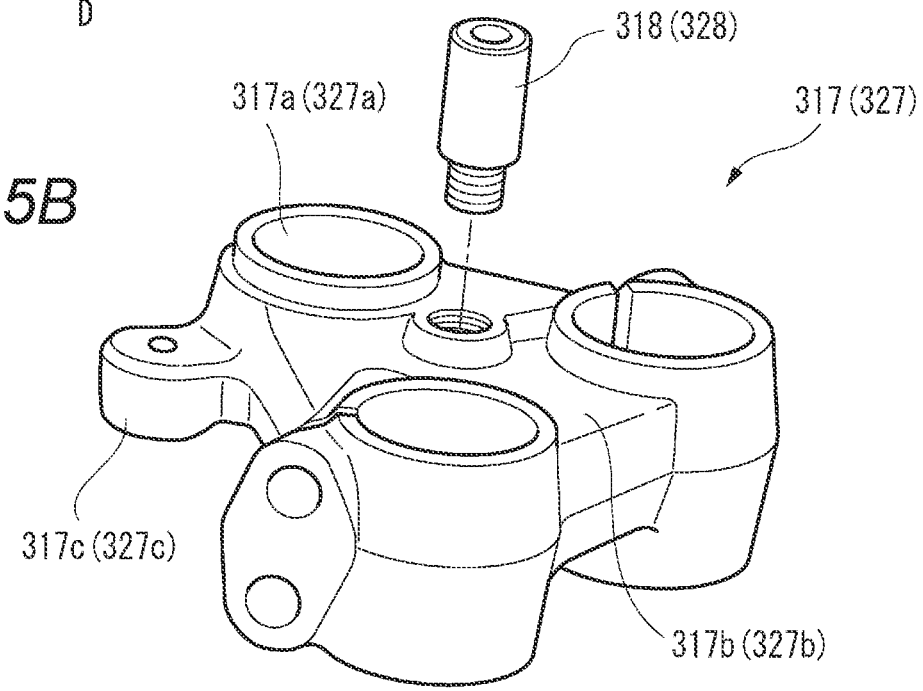

A left rod member 318 is mounted on an upper surface of the left bracket 317. As shown in FIG. 5B, the left bracket 317 and the left rod member 318 are separate members. The upper surface of the left bracket 317 is basically a flat plane.

The right bracket 327 has a symmetrical configuration with the left bracket 317 relative to the left-right direction. Consequently, as with the left bracket 317, the configuration of the right bracket 327 will be described by reference to FIGS. 5A and 5B.

As shown FIG. 5A, the right bracket 327 includes a first support portion 327*a*, a second support portion 327*b*, a third support portion 327*c*, and a left turning member 327*d*.

Figure 7A:
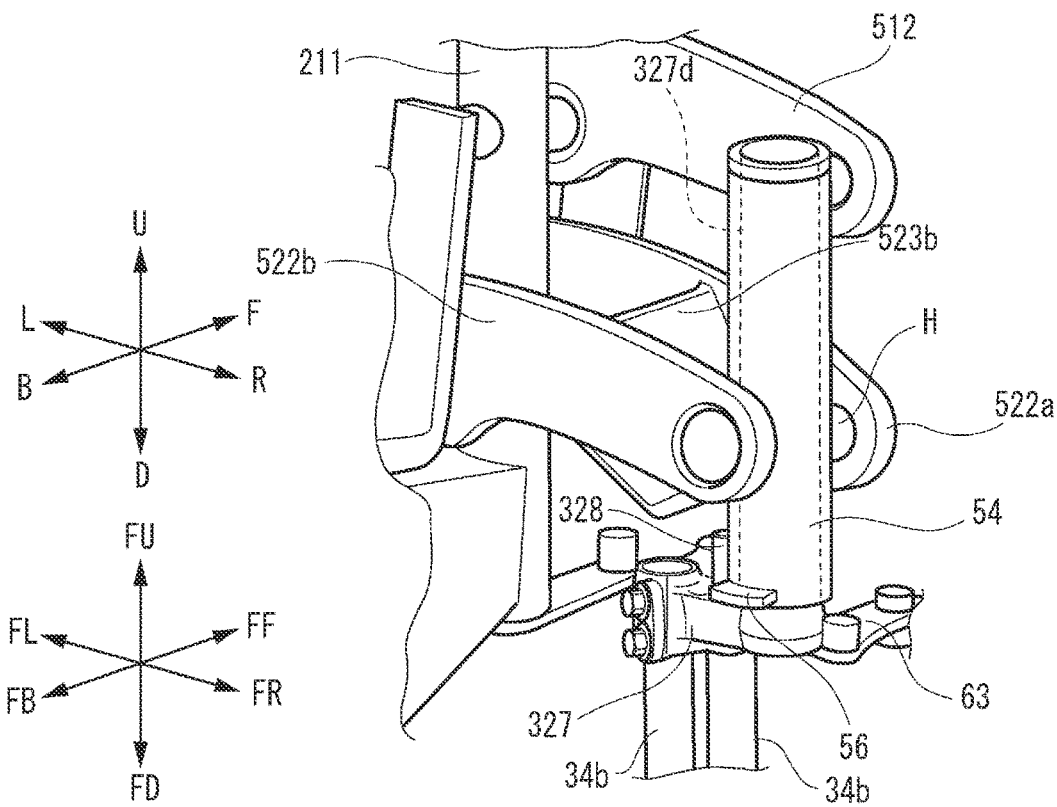
FIGS. 7A and 7B are views showing a positional relationship among the lower cross member, a right side member, and the right bracket in the vehicle of FIG. 1.
Figure 7B:
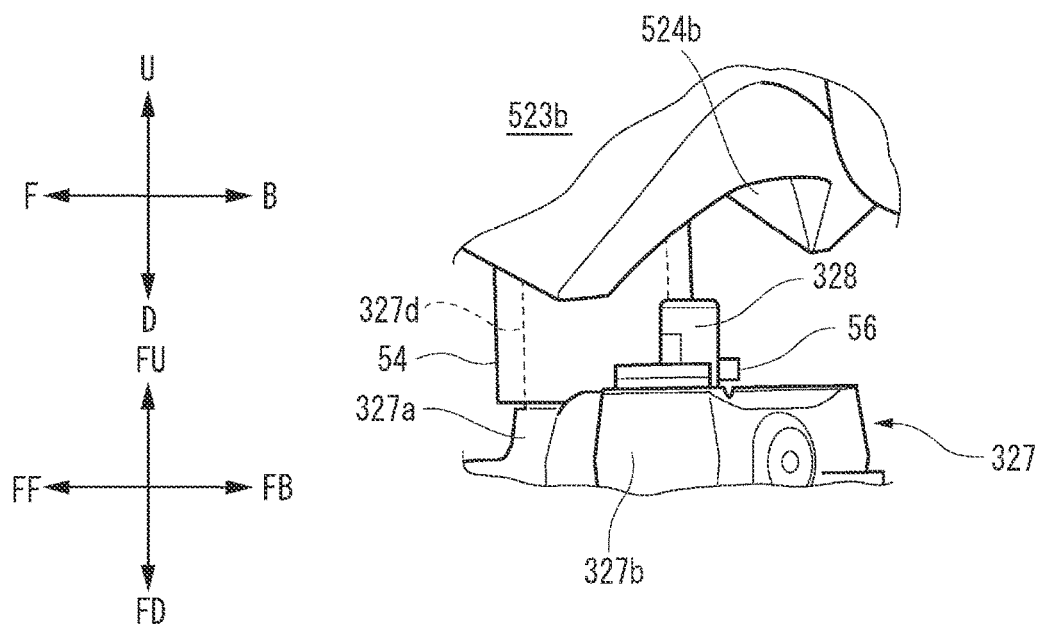

The first support portion 327*a* supports the right turning member 54*a* which is supported on the right side member 54. As shown in FIG. 7A, the right turning member 327*d* extends through an interior portion of the right side member 54 and is allowed to turn relative to the right side member 54. As shown in FIG. 7B, the right turning member 327*d* is connected to the first support portion 327*a* at a lower portion thereof. This enables the right bracket 327 to turn about the right center axis Y.

The second support portion 327*b* supports the right shock absorbing mechanism 34. Specifically, a pair of right inner tubes 34*b* of the right shock absorbing mechanism 34 are inserted into a pair of through holes in the second support portion 327*b*, respectively, and are fixed in place by fastening members, not shown.

The third support portion 327*c* supports the right transmission plate 63. Specifically, a rear end portion of the right transmission plate 63 is fixed to the third support portion 327*c* with a fastening member, not shown.

A right rod member 328 is mounted on an upper surface of the right bracket 327. As shown in FIG. 5B, the right bracket 327 and the right rod member 328 are separate members. The upper surface of the right bracket 327 is basically a flat plane.

FIG. 6A is a perspective view of a state in which the left side member 53, the left shock absorbing mechanism 33, and the left transmission plate 62 are mounted on the left bracket 317 as viewed obliquely from the left rear of the vehicle 1 (with the tie rod 67 omitted from illustration). A left stopper piece 55 is provided on a rear surface of a lower portion of the left side member 53. The left stopper piece 55 is spaced apart from the left rod member 318 when the vehicle 1 is in the upright state.

FIG. 6B shows the left bracket 317 viewed from a direction which is at right angles to the direction in which the left side member 53 extends when the vehicle 1 is in the upright state. In this state, the left rod member 318 is disposed outside the left recess 524*a* of the lower cross member 52. More specifically, the left rod member 318 is disposed in an outer area than an opening edge of the left recess 524*a* which is provided on an external surface of the left connecting block 523*a*. In addition, in the same state, the first support portion 317*a* which supports the left turning member 317*d* and the second support portion 317*b* which supports the left shock absorbing mechanism 33 overlap when viewed from a direction which is at right angles to the direction in which the left side member 53 extends.

FIG. 7A is a perspective view of a state in which the right side member 54, the right shock absorbing mechanism. 34, and the right transmission plate 63 are mounted on the right bracket 327 as viewed obliquely from the right rear of the vehicle 1 (with the tie rod 67 omitted from illustration). A right stopper piece 56 is provided on a rear surface of a lower portion of the right side member 54. The right stopper piece 56 is spaced apart from the right rod member 328 when the vehicle 1 is in the upright state.

FIG. 7B shows the right bracket 327 viewed from a direction which is at right angles to the direction in which the right side member 54 extends when the vehicle 1 is in the upright state. In this state, the right rod member 328 is disposed outside the right recess 524*b* of the lower cross member 52. More specifically, the right rod member 328 is disposed in an outer area than an opening edge of the right recess 524*b* which is provided on an external surface of the right connecting block 523*b*. In addition, in the same state, the first support portion 327*a* which supports the right turning member 327*d* and the second support portion 327*b* which supports the right shock absorbing mechanism 34 overlap when viewed from a direction which is at right angles to the direction in which the right side member 54 extends.

As shown in FIG. 8, an intermediate stopper piece 57 is provided on a front surface of a lower end portion of the head pipe 211. On the other hand, an intermediate left stopper piece 61*a* and an intermediate right stopper piece 61*b* are provided at the rear end portion of the intermediate transmission plate 61, that is, a connecting mechanism with the steering shaft 60. When the vehicle 1 is in the upright state, the intermediate left stopper piece 61*a* is on the left of the intermediate stopper piece 57, and the intermediate right stopper piece 61*b* is disposed on the right of the intermediate stopper piece 57.

As has been described by reference to FIG. 9, when the rider operates the handlebar 23 so as to turn to the left, the steering shaft 60 turns in the direction indicated by the arrow T. Then, when the turning angle reaches a predetermined value, the intermediate right stopper piece 61*b* shown in FIG. 8 is brought into abutment with a right end of the intermediate stopper piece 57. This restricts the steering shaft 60 from turning in the direction indicated by the arrow T.

Additionally, the left bracket 317 and the right bracket 327 turn in the direction indicated by the arrow T in association with the steering shaft 60 turning in the direction indicated by the arrow T. Then, when the turning angle reaches a predetermined value, the right rod member 328 shown in FIGS. 7A and 7B is brought into abutment with a left end of the right stopper piece 56. This restricts the left bracket 317 and the right bracket 327 from turning in the direction indicated by the arrow T.

On the contrary, when the rider operates the handlebar 23 so as to turn to the right, the steering shaft 60 turns in the direction indicated by the arrow S in FIG. 9. When the turning angle reaches a predetermined value, the intermediate left stopper piece 61*a* shown in FIG. 8 is brought into abutment with a left end of the intermediate stopper piece 57. This restricts the steering shaft 60 from turning in the direction indicated by the arrow S.

Additionally, the left bracket 317 and the right bracket 327 turn in the direction indicated by the arrow S in association with the steering shaft 60 turning in the direction indicated by the arrow S. Then, when the turning angle reaches a predetermined value, the left rod member 318 shown in FIGS. 6A and 6B is brought into abutment with a right end of the left stopper piece 55. This restricts the left bracket 317 and the right bracket 327 from turning in the direction indicated by the arrow S.

Figure 10:
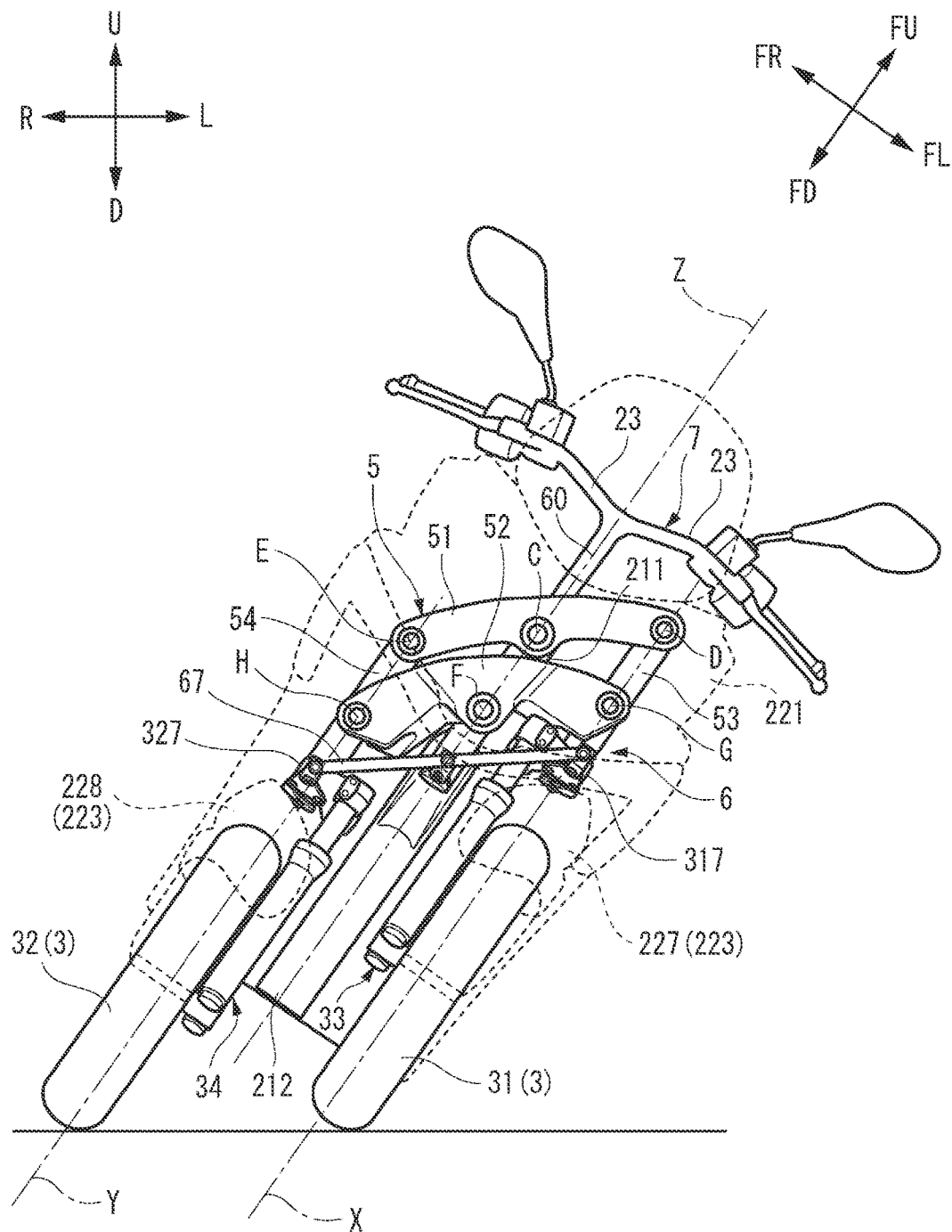
FIG. 10 is a front view showing the front portion of the vehicle of FIG. 1 when the vehicle is caused to lean.

Next, referring to FIGS. 2 and 10, a leaning operation of the vehicle 1 will be described. FIG. 10 is a front view of the front portion of the vehicle 1 as viewed from the front of the body frame 21 when the body frame 21 leans to the left of the vehicle 1. The elements shown in FIG. 10 are depicted as being seen through the front cover 221 and the pair of front fenders 223 which are shown by dashed lines.

As shown in FIG. 2, when the body frame 21 is in the upright state, when the vehicle 1 is viewed from the front of the body frame 21, the link mechanism 5 preferably has a rectangular or substantially rectangular shape. As shown in FIG. 10, with the body frame 21 leaning, when the vehicle 1 is viewed from the front of the body frame 21, the link mechanism 5 has a parallelogram shape. The deformation of the link mechanism 5 is associated with the leaning of the body frame 21 in the left-right direction. The operation of the link mechanism 5 indicates that the upper cross member 51, the lower cross member 52, the left side member 53, and the right side member 54 which define the link mechanism 5 turn relatively about the turning axes which pass through the corresponding support portions C to H, so that the shape of the link mechanism 5 changes.

For example, as shown in FIG. 10, when the rider causes the vehicle 1 to lean to the left, the head pipe 211 leans to the left from the vertical direction. When the head pipe 211 leans, the upper cross member 51 turns about the intermediate upper axis which passes through the support portion C counterclockwise as viewed from the front of the vehicle 1 relative to the head pipe 211. Similarly, the lower cross member 52 turns about the intermediate lower axis which passes through the support portion F counterclockwise as viewed from the front of the vehicle 1 relative to the head pipe 211. This causes the upper cross member 51 to move to the left relative to the lower cross member 52.

As the upper cross member 51 moves to the left, the upper cross member 51 turns about the left upper axis which passes through the support portion D and the right upper axis which passes through the support portion E counterclockwise as viewed from the front of the vehicle 1 relative to the left side member 53 and the right side member 54, respectively. Similarly, the lower cross member 52 turns about the left lower axis which passes through the support portion G and the right lower axis which passes through the support portion H counterclockwise as viewed from the front of the vehicle 1 relative to the left side member 53 and the right side member 54, respectively. This causes the left side member 53 and the right side member 54 to lean to the left from the vertical direction while holding their postures parallel to the head pipe 211.

As this occurs, the lower cross member 52 moves to the left relative to the tie rod 67. As the lower cross member 52 moves to the left, the shaft portions which are provided at the respective front portions of the intermediate joint 64, the left joint 65, and the right joint 66 turn relative to the tie rod 67. This allows the tie rod 67 to hold a parallel posture to the upper cross member 51 and the lower cross member 52.

As the left side member 53 leans to the left, the left bracket 317 which is connected to the left side member 53 leans to the left. As the left bracket 317 leans to the left, the left shock absorbing mechanism 33 which is connected to the left bracket 317 leans to the left. As the left shock absorbing mechanism 33 leans to the left, the left front wheel 31 supported on the left shock absorbing mechanism 33 leans to the left while holding its posture parallel to the head pipe 211.

As the right side member 54 leans to the left, the right bracket 327 which is connected to the right side member 54 leans to the left. As the right bracket 327 leans to the left, the right shock absorbing mechanism 34 which is connected to the right bracket 327 leans to the left. As the right shock absorbing mechanism 34 leans to the left, the right front wheel 32 supported on the right shock absorbing mechanism 34 leans to the left while holding its posture parallel to the head pipe 211.

The leaning operations of the left front wheel 31 and the right front wheel 32 are described based on the vertical direction. However, when the vehicle 1 leans (when the link mechanism 5 is activated to operate), the up-down direction of the body frame 21 does not coincide with the vertical direction. In the event that the leaning operations are described based on the up-down direction of the body frame 21, when the link mechanism 5 is activated to operate, the relative positions of the left front wheel 31 and the right front wheel 32 to the body frame 21 change. In other words, the link mechanism 5 changes the relative positions of the left front wheel 31 and the right front wheel 32 to the body frame 21 in the up-down direction of the body frame 21 to cause the body frame 21 to lean relative to the vertical direction.

When the rider causes the vehicle 1 to lean to the right, the elements lean to the right. Since the elements move the other way around in relation to the left-right direction, the detailed description thereof will be omitted here.

Thus, as has been described above, the vehicle 1 according to a preferred embodiment includes the body frame 21 which leans to the left of the vehicle 1 when the vehicle 1 turns to the left and which leans to the right of the vehicle 1 when the vehicle 1 turns to the right. The power unit 25 (an example of the power source) which produces a driving force by which the vehicle 1 is driven is supported on the body frame 21. The steering shaft 60 (an example of the steering member) is provided so as to turn about the central turning axis Z relative to the head pipe 211 which is a portion of the body frame 21. The left front wheel 31 is disposed on the left of the central turning axis Z in the left-right direction of the body frame 21. The right front wheel 32 is disposed on the right of the central turning axis Z in the left-right direction of the body frame 21. The left shock absorbing mechanism 33 is connected with the left front wheel 31. The right shock absorbing mechanism 34 is connected with the right front wheel 32. The left side member 53 is disposed on the left of the central turning axis Z in the left-right direction of the body frame 21. The right side member 54 is disposed on the right of the central turning axis Z in the left-right direction of the body frame 21. The left side member 53 and the right side member 54 do not turn in the direction in which the steering shaft 60 turns relative to the body frame 21. The left bracket 317 (an example of the left turning portion) supports the left shock absorbing mechanism 33 and turns relative to the left side member 53. The right bracket 327 (an example of the right turning portion) supports the right shock absorbing mechanism 34 and turns relative to the right side member 54. The intermediate transmission plate 61 (an example of the intermediate turning portion) turns relative to the head pipe 211 which is a portion of the body frame 21 in response to the turning of the steering shaft 60. The intermediate joint 64, the tie rod 67, the left joint 65, and the right joint 66 (an example of the connecting mechanism) connect the intermediate transmission plate 61 to the left bracket 317 via the left transmission plate 62 and connects the intermediate transmission plate 61 to the right bracket 327 via the right transmission plate 63. The intermediate joint portion 64, the tie rod 67, the left joint 65, and the right joint 66 turn the left bracket 317 and the right bracket 327 in association with the turning of the intermediate transmission plate 61.

The intermediate joint 64, the tie rod 67, the left joint 65, and the right joint 66 which connect the intermediate transmission plate 61 to the left bracket 317 and the right bracket 327 which are spaced apart from each other define the connecting mechanism. The connecting mechanism elongates in the left-right direction of the body frame 21 and has a relatively large movable range. The inventors have discovered that the attempt to enhance the rigidity of the connecting mechanism would result in the enlargement of the structure and the movable range thereof, so that the size of the vehicle tends to be enlarged. In other words, the inventors have discovered that, if it is possible to reduce the necessity of enhancing the rigidity of the connecting mechanism, the size of the connecting mechanism and the movable range thereof is reduced, so that the vehicle is made compact. In addition, the inventors have discovered that, in the case of the vehicle 1 including the left shock absorbing mechanism 33 and the right shock absorbing mechanism 34 which are connected to the left front wheel 31 and the right front wheel 32, respectively, the torque which is transmitted to the connecting mechanism as a load includes three systems including a system which is transmitted from the steering shaft 60 to the left front wheel 31 and the right front wheel 32, a system which is transmitted from the left shock absorbing mechanism 33 to the steering shaft 60, and a system which is transmitted from the right shock absorbing mechanism 34 to the steering shaft 60.

Thus, the vehicle 1 preferably includes an excessive torque restricting mechanism which is provided to restrict the magnitude of torque which is transmitted from the steering shaft 60 to the connecting mechanism, to restrict the magnitude of torque which is transmitted from the left shock absorbing mechanism 33 to the connecting mechanism, and to restrict the magnitude of torque which is transmitted from the right shock absorbing mechanism 34 to the connecting mechanism. Specifically, the head pipe 211, the intermediate transmission plate 61, the left side member 53, the left bracket 317, the right side member 54, and the right bracket 327 define the excessive torque restricting mechanism.

With the above configuration, the excessive torque restricting mechanism restricts all three systems of torque which are transmitted to the connecting mechanism. Accordingly, it is possible to reduce the load to be transmitted to the connecting mechanism, so that it is possible to reduce the necessity of enhancing the rigidity of the connecting mechanism as a countermeasure against the load. As a result, it is possible to make the connecting mechanism small in size. This reduces the size of the vehicle 1 which includes the power unit 25, the leanable body frame 21, and the two front wheels 3 which are arranged side by side in the left-right direction of the body frame 21.

Specifically, the excessive torque restricting mechanism is configured so that the torque which is transmitted from the steering shaft 60 to the connecting mechanism is transmitted to the head pipe 211 via the intermediate transmission plate 61, the torque which is transmitted from the left shock absorbing mechanism 33 to the connecting mechanism is transmitted to the left side member 53 via the left bracket 317, and the torque which is transmitted from the right shock absorbing mechanism 34 to the connecting mechanism is transmitted to the right side member 54 via the right bracket 327.

Namely, the torques which are restricted by the excessive torque restricting mechanism are released individually via the intermediate transmission plate 61, the left bracket 317 and the right bracket 327 to the head pipe 211, the left side member 53 and the right side member 54 which are turnable relative to each other. By using this configuration, it is possible to take countermeasures against the torque while reducing the necessity of enhancing the rigidity of the connecting mechanism. As a result, it is possible to make the connecting mechanism smaller in size. This reduces further the size of the vehicle 1 which includes the power unit 25, the leanable body frame 21, and the two front wheels 3 which are arranged side by side in the left-right direction of the body frame 21.

More specifically, the excessive torque restricting mechanism includes an intermediate restricting portion, a left restricting portion, and a right restricting portion. The intermediate stopper piece 57, the intermediate left stopper piece 61a, and the intermediate right stopper piece 61b restrict the intermediate transmission plate 61 from turning relative to the head pipe 211 so that the torque which is transmitted from the steering shaft 60 to the connecting mechanism is transmitted to the head pipe (an example of the intermediate restricting portion). In addition, the left stopper piece 55 and the left rod member 318 restrict the left bracket 317 from turning relative to the left side member 53 so that the torque which is transmitted from the left shock absorbing mechanism 33 to the connecting mechanism is transmitted to the left side member 53 (an example of the left restricting portion). Further, the right stopper piece 56 and the right rod member 328 restrict the right bracket 327 from turning relative to the right side member 54 so that the torque which is transmitted from the right shock absorbing mechanism 34 to the connecting mechanism is transmitted to the right side member 54 (an example of the right restricting portion).

With this configuration, it is possible to cause the excessive torque restricting mechanism that restricts three systems of torque which are transmitted to the connecting mechanism to serve also as a stopper to restrict turning amounts of the respective turnable members. This not only reduces the necessity of enhancing the rigidity of the connecting mechanism but also reduces the size in construction of the connecting mechanism compared with a case where the excessive torque restricting mechanism and the stopper are provided separately. Consequently, it is possible to reduce further the size of the vehicle 1 which includes the power unit 25, the leanable body frame 21, and the two front wheels 3 which are arranged side by side in the left-right direction of the body frame 21.

Figure 11:
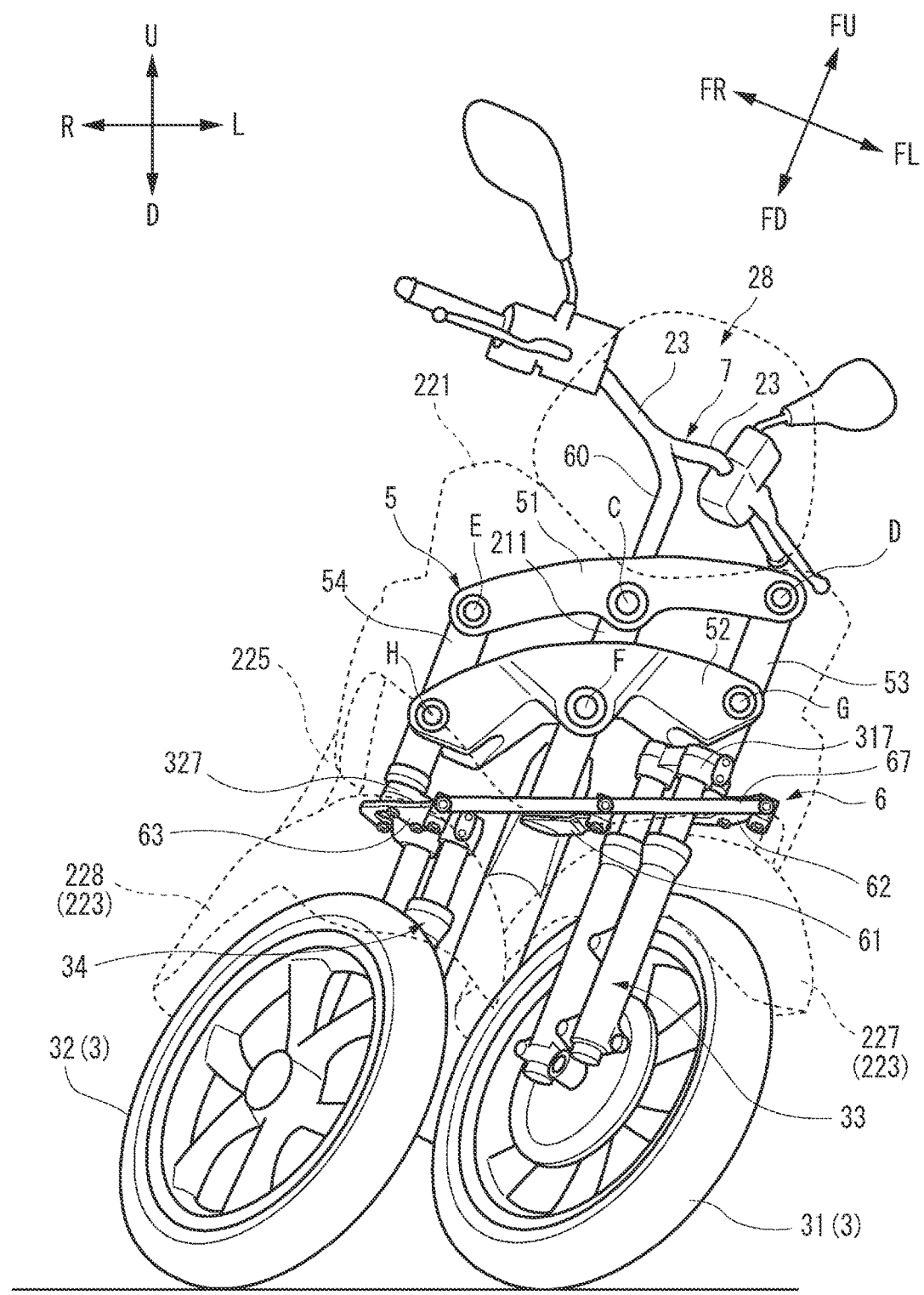
FIG. 11 is a front view showing the front portion of the vehicle of FIG. 1 when the vehicle is caused to lean and is steered.

FIG. 11 is a front view of the front portion of the vehicle with the vehicle 1 caused to lean and be steered. FIG. 11 shows a state in which the vehicle 1 is steered or turned to the left while leaning to the left. As a result of this steering operation, the left front wheel 31 and the right front wheel 32 are turned to the left, and as a result of the leaning operation, the left front wheel 31 and the right front wheel 32 lean to the left together with the body frame 21. Namely, in this state, the link mechanism 5 exhibits the parallelogram shape, and the tie rod 67 moves towards the left rear from its position which it takes when the body frame 21 is in the upright state.

Figure 12A:
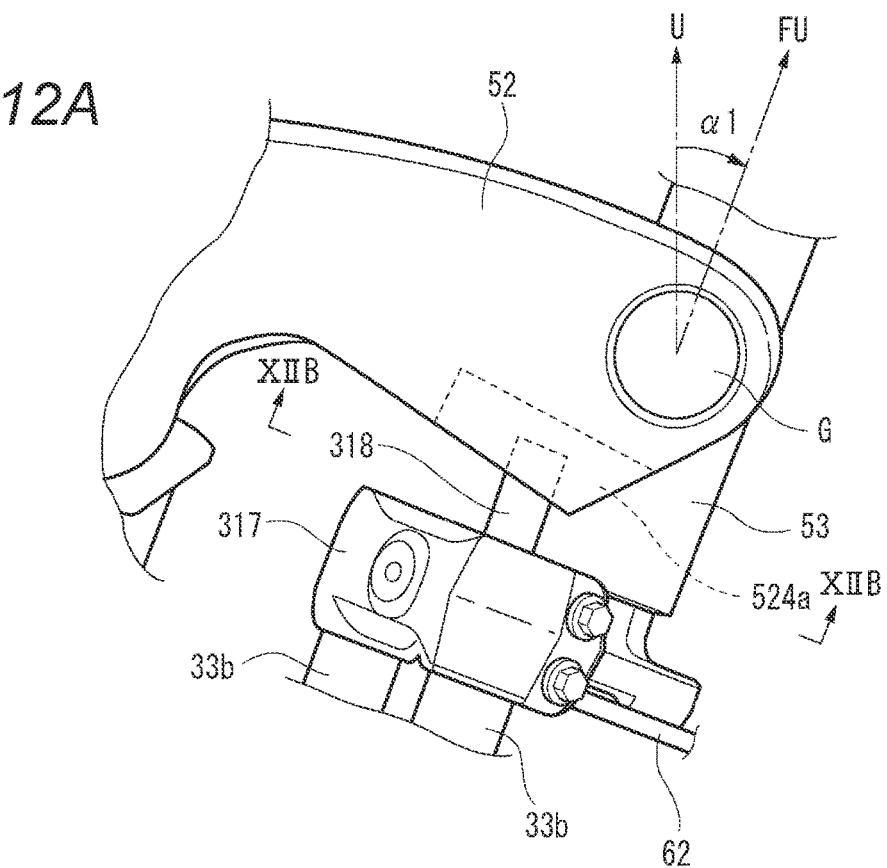
FIGS. 12A and 12B are views for explaining restricting turning of the left bracket when the vehicle is caused to lean.

As shown in FIG. 12A, when the leaning of the body frame 21 to the left of the vehicle 1 reaches a predetermined angle (an angle defined by an up direction U taken when the body frame 21 is in the upright state and an up direction FU taken when the body frame 21 leans reaches $\alpha 1$), the left rod member 318 which is provided on the left bracket 317 enters the left recess 524a on the lower cross member 52. On the other hand, as shown in FIG. 10, a distance between the right bracket 327 and the lower cross member 52 is increased.

Figure 12B:
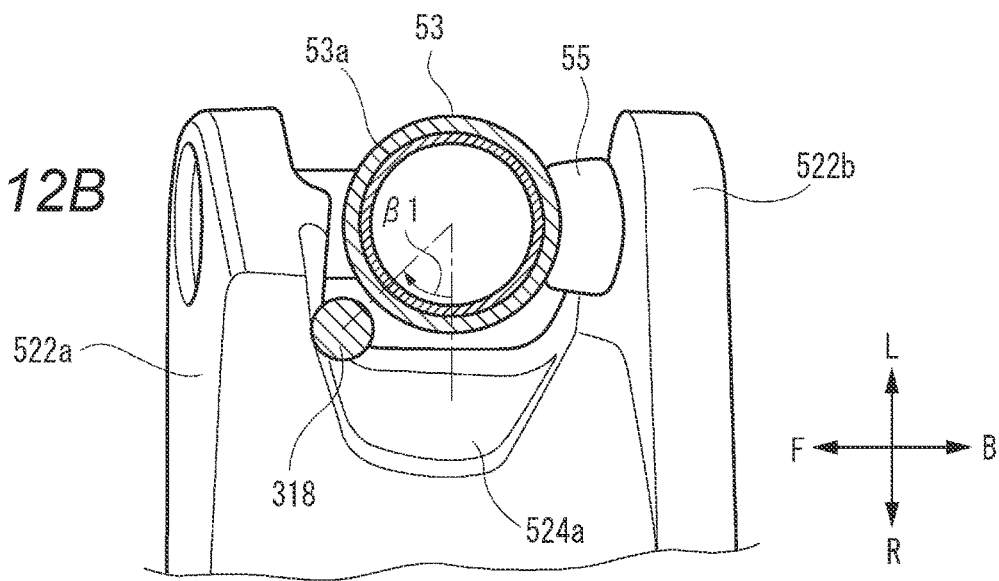

When the handlebar 23 is turned from this state to the left as shown in FIG. 11, the left bracket 317 and the right bracket 327 turn in the direction indicated by the arrow T in association with the turning of the steering shaft 60 in the direction indicated by the arrow T (refer to FIG. 9). As shown in FIG. 12B which is a sectional view taken along a line XIIB-XIIB in FIG. 12A, when the turning angle of the steering shaft 60 reaches a predetermined value, the left rod member 318 is brought into abutment with an internal surface of the left recess 524a to restrict the turning of the left bracket 317. In association with this, the steering shaft 60 is restricted from turning in the direction indicated by the arrow T via the left transmission plate 62, the tie rod 67, and the intermediate transmission plate 61. As a result, the handlebar 23 is restricted from turning to the left. Namely, the magnitude of the torque is restricted which is transmitted from the steering shaft 60 to the connecting mechanism.

Although illustration is omitted, on the contrary, when the body frame 21 is caused to lean to the right of the vehicle 1, when the leaning angle reaches a predetermined value, the right rod member 328 which is provided on the right bracket 327 enters the right recess 524b on the lower cross member 52. On the other hand, a distance between the left bracket 317 and the lower cross member 52 is increased.

When the handlebar 23 is turned from this state to the right, the steering shaft 60 turns in the direction indicated by the arrow S (refer to FIG. 9), in association with which the left bracket 317 and the right bracket 327 turn in the direction indicated by the arrow S. When the turning angle of the steering shaft 60 reaches a predetermined value, the right rod member 328 is brought into abutment with an internal surface of the right recess 524b, so that the right bracket 327 is restricted from turning. In association with this, the steering shaft 60 is restricted from turning in the direction indicated by the arrow S via the right transmission plate 63, the tie rod 67, and the intermediate transmission plate 61. As a result, the handlebar 23 is restricted from turning to the right. Namely, the magnitude of the torque is restricted which is transmitted from the steering shaft 60 to the connecting mechanism.

Thus, as has been described above, the vehicle 1 according to a preferred embodiment of the present invention includes the link mechanism 5. The link mechanism 5 changes the relative positions of the left front wheel 31 and the right front wheel 32 to the body frame 21 to cause the body frame 21 to lean from the state where the body frame 21 is in the upright state to the left or right of the vehicle 1. On the other hand, the excessive torque restricting mechanism includes the left steering restricting portion and the right steering restricting portion. The left steering restricting portion restricts the magnitude of the torque which is transmitted from the steering shaft 60 to the connecting mechanism when the leaning angle of the body frame 21 at which the body frame 21 leans from the state where the body frame 21 is in the upright state to the left of the vehicle 1 exceeds the predetermined value $\alpha 1$. The right steering restricting portion restricts the magnitude of the torque which is transmitted from the steering shaft 60 to the connecting mechanism when the leaning angle of the body frame 21 at which the body frame 21 leans from the state where the body frame 21 is in the upright state to the right of the vehicle 1 exceeds the predetermined value $\alpha 1$.

When steering is executed in such a state that the relative positions of the left front wheel 31 and the right front wheel 32 to the body frame 21 is changed to shift the body frame 21 from the state where the body frame 21 is in the upright state to the state where the body frame 21 leans, the load which is exerted on the connecting mechanism via the steering shaft 60 becomes very large. According to the configuration described above, the magnitude of the torque which is transmitted from the steering shaft 60 to the connecting mechanism in such a condition is restricted by the right steering restricting portion and the left steering restricting portion, and therefore, the necessity is reduced of enhancing the rigidity of the connecting mechanism. As a result, it is possible to make the connecting mechanism smaller in size. This reduces further the size of the vehicle 1 which includes the power unit 25, the leanable body frame 21, and the two front wheels 3 which are arranged side by side in the left-right direction of the body frame 21.

The turning angle through which the steering shaft 60 turns in the direction indicated by the arrow T until the left rod member 318 is brought into abutment with the internal surface of the left recess 524a is set smaller than the turning angle through which the steering shaft 60 turns in the direction indicated by the arrow T until the intermediate right stopper piece 61b shown in FIG. 8 is brought into abutment of the intermediate stopper piece 57. In addition, the turning angle through which the steering shaft 60 turns in the direction indicated by the arrow T until the left rod member 318 is brought into abutment with the internal surface of the left recess 524a is set smaller than the turning angle at which the steering shaft 60 turns in the direction indicated by the arrow T until the right rod member 328 shown in FIG. 7 is brought into abutment of the right stopper piece 56. Consequently, when the body frame 21 is leaning to the left of the vehicle 1, a permissible turning angle of the handlebar 23 to the left becomes smaller than when the body frame 21 is in the upright state.

Figure 13A:
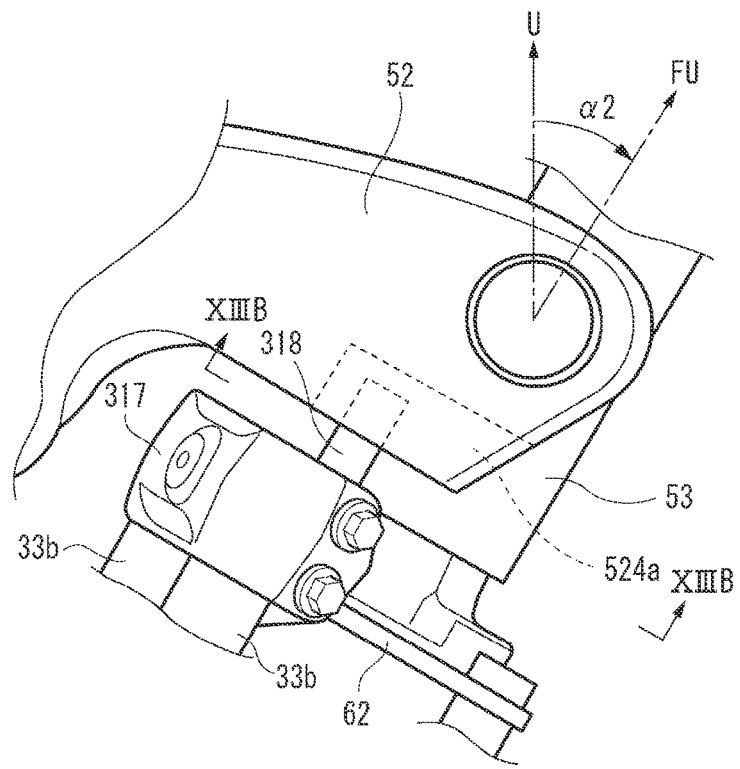
FIGS. 13A and 13B are views for explaining restricting turning of the left bracket when the vehicle is caused to lean with larger angle.
Figure 13B:
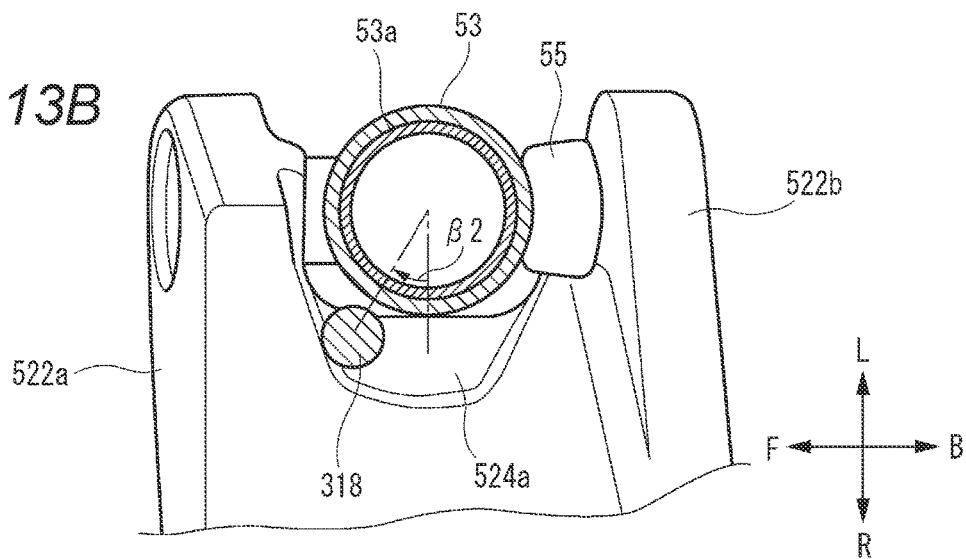

FIG. 13A shows a state in which the leaning angle of the body frame 21 to the left of the vehicle 1 becomes larger (a state in which the angle defined by the up direction U taken when the body frame 21 is in the upright state and the up direction FU taken when the body frame 21 is leaning reaches $\alpha 2$). As this occurs, the left rod member 318 enters the left recess 524a deeper. When the handlebar 23 is turned from this state in which the body frame 21 is leaning to the left, as in FIG. 13B which is a sectional view taken along a line XIIIB-XIIIB in FIG. 13A, as with the case shown in FIG. 12B, the left rod member 318 is brought into abutment with the internal surface of the left recess 524a to restrict the turning of the left bracket 317.

As has been described by reference to FIG. 4B, the left recess 524a is provided in such a way that a width becomes narrower in the front-rear direction as it extends upwards. Consequently, the turning angle (a turning angle $\beta 2$ of the left bracket 317) through which the steering shaft 60 turns in the direction indicated by the arrow T until the left rod member 318 is brought into the internal surface of the left recess 524a becomes smaller than the case shown in FIG.

12B (a turning angle β1 of the left bracket 317). Namely, as the body frame 21 leans further to the left of the vehicle 1, the permissible turning angle of the handlebar 23 to the left becomes smaller.

The turning angle through which the steering shaft 60 turns in the direction indicated by the arrow S until the right rod member 328 is brought into abutment with the internal surface of the right recess 524b is set smaller than the turning angle through which the steering shaft 60 turns in the direction indicated by the arrow S until the intermediate left stopper piece 61a shown in FIG. 8 is brought into abutment of the intermediate stopper piece 57. In addition, the turning angle through which the steering shaft 60 turns in the direction indicated by the arrow S until the right rod member 328 is brought into abutment with the internal surface of the right recess 524b is set smaller than the turning angle at which the steering shaft 60 turns in the direction indicated by the arrow S until the right rod member 328 shown in FIGS. 6A and 6B is brought into abutment of the right stopper piece 56. Consequently, when the body frame 21 is leaning to the right of the vehicle 1, a permissible turning angle of the handlebar 23 to the right becomes smaller than when the body frame 21 is in the upright state.

When the leaning angle of the body frame 21 to the right of the vehicle 1 becomes larger, the right rod member 328 enters the right recess 524b deeper. When the handlebar 23 is turned from this leaning state to the right, the right rod member 328 is brought into abutment with the internal surface of the right recess 524b in the similar way to that described above to restrict the right bracket 327 turning.

As has been described by reference to FIG. 4B, the right recess 524b is provided in such a way that a width becomes narrower in the front-rear direction as it extends farther from the entrance thereof. Consequently, the turning angle through which the steering shaft 60 turns in the direction indicated by the arrow S until the right rod member 328 is brought into abutment with the internal surface of the right recess 524b becomes smaller. Namely, as the body frame 21 leans further to the right of the vehicle 1, the permissible turning angle of the handlebar 23 to the right becomes smaller.

Namely, the left steering restricting portion includes the left recess 524a which is provided on the lower cross member 52 of the link mechanism 5 and the left rod member 318 (an example of the left projection) which is provided on the left bracket 317. The right steering restricting portion includes the right recess 524b which is provided on the lower cross member 52 of the link mechanism 5 and the right rod member 328 (an example of the right projection) which is provided on the right bracket 327. In the event that the leaning angle at which the body frame 21 leans from the state where the body frame 21 is in the upright state in the left-right direction thereof is α1 (an example of the first leaning angle), when the turning angle of the steering shaft 60 reaches β1 (an example of the first turning angle), the left rod member 318 is brought into abutment with the internal surface of the left recess 524a or the right rod member 328 is brought into abutment with the internal surface of the right recess 524b, so that the steering shaft 60 is restricted from turning. In the event that the leaning angle at which the body frame 21 leans from the state where the body frame 21 is in the upright state in the left-right direction thereof is α2 (an example of the second leaning angle) which is larger than α1, when the turning angle of the steering shaft 60 reaches β2 (an example of the second turning angle) which is smaller than β1, the left rod member 318 is brought into abutment with the internal surface of the left recess 524a or the right rod member 328 is brought into abutment with the internal surface of the right recess 524b, so that the steering shaft 60 is restricted from turning.

According to this configuration, when the steering shaft 60 is turned to some extent in such a state that the body frame 21 leans to some extent, the left rod member 318 is brought into abutment with the internal surface of the left recess 524a or the right rod member 328 is brought into abutment with the internal surface of the right recess 524b. In a case where the body frame 21 leans at a larger angle, the left rod member 318 is brought into abutment with the internal surface of the left recess 524a or the right rod member 328 is brought into abutment with the internal surface of the right recess 524b in such a state that the turning angle of the steering shaft 60 is smaller. The steering shaft 60 is restricted from turning and the left bracket 317 and the right bracket 327 are restricted from turning as a result of the left rod member 318 being brought into abutment with the internal surface of the left recess 524a or the right rod member 328 being brought into abutment with the internal surface of the right recess 524b. Namely, the extent where the both front wheels 3 are restricted from turning or the steering shaft 60 is restricted from turning is changed according to the magnitude of the leaning angle of the body frame 21. Consequently, the restriction on the load exerted on the connecting mechanism is executed properly according to the leaning angle of the body frame 21 and the steering angle of the steering member 7, and therefore, it is possible to reduce further the necessity of enhancing the rigidity of the connecting mechanism. This further reduces the size of the connecting mechanism. Consequently, it is possible to reduce further the size of the vehicle 1 which includes the power unit 25, the leanable body frame 21, and the two front wheels 3 which are arranged side by side in the left-right direction of the body frame 21.

In the vehicle 1 according to the preferred embodiments described above, the left recess 524a and the right recess 524b are provided on the lower cross member 52 of the link mechanism 5. The left rod member 318 is provided on the left bracket 317 and defines a portion of the left restricting portion which transmits the torque transmitted from the left shock absorbing mechanism 33 to the left side member 53. The right rod member 328 is provided on the right bracket 327 and defines a portion of the right restricting portion which transmits the torque transmitted from the right shock absorbing mechanism 34 to the right side member 54.

In other words, the portion of the left steering restricting portion serves as the left restricting portion, while the portion of the right steering restricting portion serves as the right restricting portion. With this configuration, the number of parts is decreased, thus making the restricting mechanism small in size. Consequently, the vehicle 1 including the power unit 25, the leanable body frame 21, and the two front wheels 3 which are arranged side by side in the left-right direction of the body frame 21 is made small in size while reducing the size of the connecting mechanism.

As has been described by reference to FIG. 6B and FIG. 7B, when the body frame 21 is in the upright state, the left rod member 318 is disposed outside the left recess 524a. In addition, the right rod member 328 is disposed outside the right recess 524b when the body frame 21 is in the upright state.

The restriction of the magnitude of torque which is transmitted from the steering shaft 60 to the connecting mechanism when the body frame 21 is in the upright state is executed by the intermediate restricting portion which includes the intermediate stopper piece 57, the intermediate left stopper piece 61a, and the intermediate right stopper piece 61b. Consequently, the sizes of the left recess 524a and the right recess 524b which restrict the steering shaft 60 from turning when the body frame 21 is leaning is made as small as possible. In other words, it is possible to make the size of a wall portion, which separates the left recess 524a from the right recess 524b on the lower cross member 52, as small as possible. Thus, the size of the lower cross member 52 is reduced while ensuring the rigidity which is required on the wall portion. Consequently, the vehicle 1 including the power unit 25, the leanable body frame 21 and the two front wheels 3 which are arranged side by side in the left-right direction of the body frame 21 is made small in size while reducing the size of the connecting mechanism.

As has been described by reference to FIGS. 5A and 5B, the left bracket 317 includes the portion which supports the left shock absorbing mechanism 33 and the portion which supports the left rod member 318 which is a separate member. The right bracket 327 includes the portion which supports the right shock absorbing mechanism 34 and the portion which supports the left rod member 318 which is a separate member.

In this case, compared with a case where the portion which restricts the turning of the steering shaft 60 and the portions which support the shock absorbing mechanisms are integral and unitary (monolithic), the left bracket 317 and the right bracket 327 is able to be produced at low cost and with high accuracy. This defines the turning extents of the left bracket 317 and the right bracket 327. This enables an inner circumferential surface of the front cover 221 (an example of the body cover) which accommodates these mechanisms to lie as close to the turning extents as possible, thus making it possible to reduce the size of the front cover 221. Consequently, the vehicle 1 including the power unit 25, the leanable body frame 21, and the two front wheels 3 which are arranged side by side in the left-right direction of the body frame 21 is made small in size while reducing the size of the connecting mechanism.

As has been described by reference to FIG. 6B and FIG. 7B, the left bracket 317 includes the first support portion 317a which supports the left turning member 317d which is supported on the left side member 53. The first support portion 317a and the second support portion 317b which supports the left shock absorbing mechanism 33 overlap as viewed from the direction which is at right angles to the direction in which the left side member 53 extends. The right bracket 327 includes the first support portion 327a which supports the right turning member 327d which is supported on the right side member 54. The first support portion 327a and the second support portion 327b which supports the right shock absorbing mechanism 34 overlap as viewed from the direction which is at right angles to the direction in which the right side member 54 extends.

According to this configuration, the shapes of the left bracket 317 and the right bracket 327 are able to have simpler shapes which are based on flat planes. Consequently, it is possible to reduce the size of the vehicle 1 which includes the power unit 25, the leanable body frame 21, and the two front wheels 3 which are arranged side by side in the left-right direction of the body frame 21 while restricting the fabrication costs and enhancing the ease with which the dimensions are controlled.

As has been described by reference to FIG. 6A and FIG. 7A, the left shock absorbing mechanism 33 and the right shock absorbing mechanism 33 each includes the plurality of telescopic elements.

According to this configuration, the construction weight on the periphery of each front wheel 3 is increased instead of enhancing the shock absorbing performance. Consequently, although the turning moment of each of the front wheels 3 which is associated with steering or turning becomes large, the increase in the load exerted on the connecting mechanism is restricted by the excessive torque restricting portion. Accordingly, the necessity for enhancing the rigidity of the connecting mechanism is further reduced. As a result, it is possible to make the connecting mechanism smaller in size. This reduces further the size of the vehicle 1 which includes the power unit 25, the leanable body frame 21, and the two front wheels 3 which are arranged side by side in the left-right direction of the body frame 21.

The preferred embodiments described above are intended to facilitate the understanding of the present invention and are not intended to limit the present invention. The preferred embodiments of the present invention can be modified or improved without departing from the scope thereof and that their equivalents can be also included in the present invention.

In the above preferred embodiments, the single left stopper piece 55 is preferably provided on the left side member 53, and when the handlebar 23 is turned to the right (when the handlebar 23 is operated in the direction indicated by the arrow S in FIG. 9), the left rod member 318 is brought into abutment with the left stopper piece 55 so as to restrict the left bracket 317 from turning in the direction indicated by the arrow S. However, a plurality of left stopper pieces 55 can be provided. For example, a configuration may be used in which another stopper piece is provided on a front surface of the left side member 53, so that the left rod member 318 is brought into abutment with the stopper piece when the handlebar 23 is turned to the left (when the handlebar 23 is operated in the direction indicated by the arrow T in FIG. 9) through a predetermined angle or larger. As this occurs, the restriction on the turning of the left bracket 317 is made to cooperate with the restriction on the turning of the right bracket 327.

In the above preferred embodiments, the single right stopper piece 56 is preferably provided on the right side member 54, and when the handlebar 23 is turned to the left (when the handlebar 23 is operated in the direction indicated by the arrow T in FIG. 9), the right rod member 328 is brought into abutment with the right stopper piece 56 so as to restrict the right bracket 327 from turning in the direction indicated by the arrow T. However, a plurality of right stopper pieces can be provided. For example, a configuration may be used in which another stopper piece is provided on a front surface of the right side member 54, so that the right rod member 328 is brought into abutment with the stopper piece when the handlebar 23 is turned to the right (when the handlebar 23 is operated in the direction indicated by the arrow S in FIG. 9) through a predetermined angle or larger. As this occurs, the restriction on the turning of the right bracket 327 is made to cooperate with the restriction on the turning of the left bracket 317.

In the above preferred embodiments, the left rod member 318 is preferably allowed to be brought into abutment with the left stopper piece 55 and is also allowed to be brought into abutment with the internal surface of the left recess 524a on the lower cross member 52. In other words, the left rod member 318 defines a portion of the left restricting portion and also defines a portion of the left steering restricting portion. However, the member defining a portion of the left restricting portion and the member defining a portion of the left steering restricting portion may be separate from each other.

In the above preferred embodiments, the right rod member 328 is preferably allowed to be brought into abutment with the right stopper piece 56 and is also allowed to be brought into abutment with the internal surface of the right recess 524b on the lower cross member 52. In other words, the right rod member 328 defines a portion of the right restricting portion and also defines a portion of the right steering restricting portion. However, the member defining a portion of the right restricting portion and the member defining a portion of the right steering restricting portion may be separate from each other.

In the above preferred embodiments, the left recess 524a is preferably provided on the lower cross member 52, and the left rod member 318 (an example of the left projection) which is provided on the left bracket 317 is allowed to enter the left recess 524a. However, a left recess may be provided on the left bracket 317, and a left projection which is allowed to enter the left recess may be provided on the lower cross member 52.

In the above preferred embodiments, the right recess 524b is preferably provided on the lower cross member 52, and the right rod member 328 (an example of the right projection) which is provided on the right bracket 327 is allowed to enter the right recess 524b. However, a left recess may be provided on the right bracket 327, and a right projection which is allowed to enter the right recess may be provided on the lower cross member 52.

In the above preferred embodiments, the left rod member 318 which is preferably provided as a separate member is mounted on the left bracket 317. Additionally, the right rod member 328 which is provided as a separate member is mounted on the right bracket 327. However, the left bracket 317 and the left rod member 318 may be integral and unitary (monolithic) according to the specification of the vehicle 1. Similarly, the right bracket 327 and the right rod member 328 may be monolithic.

In the above preferred embodiments, the left shock absorbing mechanism 33 and the right shock absorbing mechanism 34 each preferably includes the pair of telescopic mechanisms. However, the left shock absorbing mechanism 33 and the right shock absorbing mechanism 34 may each include a single telescopic mechanism.

In the above preferred embodiments, the vehicle 1 preferably includes the single rear wheel 4. However, a plurality of rear wheels may be provided.

In the above preferred embodiments, the center of the rear wheel 4 in relation to the left-right direction of the body frame 21 coincides with the center of the distance defined between the left front wheel 31 and the right front wheel 32 in relation to the left-right direction of the body frame 21. Although the configuration described above is preferable, the center of the rear wheel 4 in relation to the left-right direction of the body frame 21 may not coincide with the center of the distance defined between the left front wheel 31 and the right front wheel 32 in relation to the left-right direction of the body frame 21.

In the above preferred embodiments, the link mechanism 5 preferably includes the upper cross member 51 and the lower cross member 52. However, the link mechanism 5 may include a cross member other than the upper cross member 51 and the lower cross member 52. The "upper cross member" and the "lower cross member" are merely so called based on their relative positions in relation to the up-down direction. The upper cross member does not necessarily mean an uppermost cross member in the link mechanism 5. The upper cross member means a cross member which lies above another cross member which lies therebelow. The lower cross member does not necessarily mean a lowermost cross member in the cross mechanism 5. The lower cross member means a cross member which lies below another cross member which lies thereabove. At least one of the upper cross member 51 and the lower cross member 52 may be made up of two portions such as a right cross member and a left cross member. In this way, the upper cross member 51 and the lower cross member 52 may be made up of a plurality of cross members as long as they maintain the link function.

In the above preferred embodiments, the link mechanism 5 preferably defines the so-called parallel four joint link system. However, the link mechanism 5 may have a so-called double wishbone system.

The terms and expressions that are used in this description are used to describe the preferred embodiments of the present invention and hence should not be construed as limiting the scope of the present invention. It should be understood that any equivalents to the characteristic matters that are shown and described in this description should not be excluded and that various modifications made within the scope of claims to be made later are permitted.

When used in this description, the word "parallel" means that two straight lines which do not intersect each other as members while they are inclined at an angle falling within the range of ±40 degrees are included therein. When used in this description in relation to a direction and/or a member, the word "along" means that a case where the direction or the member is inclined at an angle falling within the range of ±40 degrees is included therein. When used in this description, the expression "something extends in a certain direction" means that a case where something extends while being inclined at an angle falling within the range of ±40 degrees relative to the certain direction is included therein.

The present invention can be embodied in many different forms. This description should be regarded as providing the preferred embodiments according to the principles of the present invention. The preferred embodiments which are at least described or illustrated in this description are described or illustrated based on the understanding that the preferred embodiments are not intended to limit the present invention.

The present invention includes every preferred embodiment which includes an equivalent element, a modification, a deletion, a combination (for example, a combination of characteristics of various preferred embodiments), an improvement and an alteration which can be recognized by those skilled in the art to which the invention pertains based on the preferred embodiments disclosed in this description. The limitative matters of claims should be construed broadly based on terms used in the claims and hence should not be limited by the preferred embodiments described in this specification or the prosecution of this patent application. The preferred embodiments should be construed as being non-exclusive. For example, in this description, the terms "preferable" and "may" should be construed as being non-exclusive, and those terms mean, respectively, that it is "preferable but not limited thereto" and that it "may be acceptable but not limited thereto."

This application claims priority to Japanese Patent Application No. 2013-138480 filed on Jul. 1, 2013, the contents of which are hereby incorporated by reference. That is, the configurations listed below also constitute a portion of the description of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
a body frame that leans to the left of the vehicle when the vehicle turns to the left and leans to the right of the vehicle when the vehicle turns to the right;
a power source supported by the body frame and that generates a force to drive the vehicle;
a steering member that is turnable about a turning axis relative to the body frame;
a left front wheel disposed on the left of the turning axis in a left-right direction of the body frame;
a right front wheel disposed on the right of the turning axis in the left-right direction of the body frame;
a left shock absorbing mechanism connected to the left front wheel;
a right shock absorbing mechanism connected to the right front wheel;
a left side member disposed on the left of the turning axis in the left-right direction of the body frame, and that is not turnable in a turning direction of the steering member relative to the body frame;
a right side member disposed on the right of the turning axis in the left-right direction of the body frame, and that is not turnable in the turning direction of the steering member relative to the body frame;
a left turning portion supporting the left shock absorbing mechanism, and that is turnable relative to the left side member;
a right turning portion supporting the right shock absorbing mechanism, and that is turnable relative to the right side member;
an intermediate turning portion that is turnable relative to the body frame in accordance with turning of the steering member;
a connecting mechanism connecting the intermediate turning portion with the left turning portion and the right turning portion, and that causes the left turning portion and the right turning portion to turn in association with turning of the intermediate turning portion; and
an excessive torque restricting mechanism that restricts:
a magnitude of a torque transmitted from the steering member to the connecting mechanism;
a magnitude of a torque that is transmitted from the left shock absorbing mechanism to the connecting mechanism; and
a magnitude of a torque that is transmitted from the right shock absorbing mechanism to the connecting mechanism.

2. The vehicle as set forth in claim 1, wherein the excessive torque restricting mechanism:
transmits the torque, that is transmitted from the steering member to the connecting mechanism, to the body frame via the intermediate turning portion;
transmits the torque, that is transmitted from the left shock absorbing mechanism to the connecting mechanism, to the left side member via the left turning portion; and
transmits the torque, that is transmitted from the right shock absorbing mechanism to the connecting mechanism, to the right side member via the right turning portion.

3. The vehicle as set forth in claim 2, wherein the excessive torque restricting mechanism includes:
an intermediate restricting portion that transmits the torque, that is transmitted from the steering member to the connecting mechanism, to the body frame by restricting turning of the intermediate turning portion relative to the body frame;
a left restricting portion that transmits the torque, that is transmitted from the left shock absorbing mechanism to the connecting mechanism, to the left side member by restricting turning of the left turning portion relative to the left side member; and
a right restricting portion that transmits the torque, that is transmitted from the right shock absorbing mechanism to the connecting mechanism, to the right side member by restricting turning of the right turning portion relative to the right side member.

4. The vehicle as set forth in claim 3, further comprising a link mechanism that causes the body frame to lean from an upright state to the left or to the right by changing positions of the left front wheel and the right front wheel relative to the body frame; wherein
the excessive torque restricting mechanism includes:
a left steering restricting mechanism that restricts a magnitude of a torque, that is transmitted from the steering member to the connecting mechanism, when a leaning angle of the body frame from the upright state thereof to the left exceeds a predetermined value; and
a right steering restricting mechanism that restricts a magnitude of a torque, that is transmitted from the steering member to the connecting mechanism, when a leaning angle of the body frame from the upright state thereof to the right exceeds a predetermined value.

5. The vehicle as set forth in claim 4, wherein:
the link mechanism includes an upper cross member, and a lower cross member disposed below the upper cross member;
the upper cross member, the lower cross member, the left side member, and the right side member are connected such that the upper cross member and the lower cross member are held in postures which are parallel or substantially parallel to each other, and that the left side member and the right side member are held in postures which are parallel or substantially parallel to each other;
the left steering restricting mechanism includes a left recess provided in one of the lower cross member and the left turning portion, and a left projection provided on the other one of the lower cross member and the left turning portion;
the right steering restricting mechanism includes a right recess provided in one of the lower cross member and the right turning portion, and a right projection provided on the other one of the lower cross member and the right turning portion;
in a case where the leaning angle of the body frame from the upright state thereof to the left or to the right is a first leaning angle, when turning of the steering member reaches a first turning angle, the turning of the steering member is restricted by the left projection brought into abutment with an internal surface of the left recess or the right projection brought into abutment with an internal surface of the right recess; and
in a case where the leaning angle of the body frame from the upright state thereof to the left or to the right is a second leaning angle which is larger than the first leaning angle, when the turning of the steering member reaches a second turning angle which is smaller than the first turning angle, the turning of the steering member is restricted by the left projection brought into abutment with an internal surface of the left recess or the right projection brought into abutment with an internal surface of the right recess.

6. The vehicle as set forth in claim 5, wherein:

the left recess and the right recess are provided in the lower cross member;

the left projection is provided on the left turning portion to define a portion of the left restricting portion; and the right projection is provided on the right turning portion to define a portion of the right restricting portion.

7. The vehicle as set forth in claim 5, wherein:

the left recess and the right recess are provided in the lower cross member;

the left projection is provided on the left turning portion;

the right projection is provided on the right turning portion;

the left projection is located outside of the left recess when the body frame is in the upright state thereof; and the right projection is located outside of the right recess when the body frame is in the upright state thereof.

8. The vehicle as set forth in claim 5, wherein:

the left recess and the right recess are provided in the lower cross member;

the left turning portion includes a left bracket provided with a portion supporting the left shock absorbing mechanism, and with a portion supporting the left projection which is a separate member from the left bracket; and the right turning portion includes a right bracket provided with a portion supporting the right shock absorbing mechanism, and with a portion supporting the right projection which is a separate member from the right bracket.

9. The vehicle as set forth in claim 8, wherein:

the left bracket includes a portion supporting a left turning member which is supported by the left side member;

the portion supporting the left turning member and the portion supporting the left shock absorbing mechanism overlap when viewed from a direction perpendicular or substantially perpendicular to a direction in which the left side member extends; and the right bracket includes a portion supporting a right turning member which is supported by the right side member; and the portion supporting the right turning member and the portion supporting the right shock absorbing mechanism overlap when viewed from a direction perpendicular or substantially perpendicular to a direction in which the right side member extends.

10. The vehicle as set forth in claim 1, wherein each of the left shock absorbing mechanism and the right shock absorbing mechanism includes a plurality of telescopic mechanisms.

* * * * *